United States Patent
Billi et al.

(10) Patent No.: US 10,313,281 B2
(45) Date of Patent: Jun. 4, 2019

(54) DELIVERY OF AUTOMATED NOTIFICATIONS BY AN INDUSTRIAL ASSET

(71) Applicant: Rockwell Automation Technologies, Inc., Mayfield Heights, OH (US)

(72) Inventors: Sharon M. Billi, Euclid, OH (US); Christopher W. Como, Chagrin Falls, OH (US); Edward A. Gray, Olmsted Township, OH (US); Kyle K. Reissner, Hudson, OH (US); Jonathan D. Walter, Broadview Heights, OH (US); Mohit Singhai, Lyndhurst, OH (US); Douglas J. Reichard, Fairview Park, OH (US); Scott N. Sandler, Chagrin Falls, OH (US); Ronald E. Bliss, Twinsburg, OH (US); Michael J. Pantaleano, Willoughby, OH (US); Ryan Cahalane, Chagrin Falls, OH (US); Jessica Korpela, Milwaukee, WI (US); Bruce T. McCleave, Mission Viejo, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 560 days.

(21) Appl. No.: 14/987,399

(22) Filed: Jan. 4, 2016

(65) Prior Publication Data
US 2017/0195265 A1 Jul. 6, 2017

(51) Int. Cl.
*G06F 15/16* (2006.01)
*H04L 12/58* (2006.01)
(Continued)

(52) U.S. Cl.
CPC ........ *H04L 51/046* (2013.01); *G05B 23/0267* (2013.01); *G06Q 10/0631* (2013.01);
(Continued)

(58) Field of Classification Search
CPC .................................................. H04L 63/0884
See application file for complete search history.

(56) References Cited

U.S. PATENT DOCUMENTS

| 5,168,441 A | 12/1992 | Onarheim et al. |
| 5,777,874 A | 7/1998 | Flood et al. |

(Continued)

FOREIGN PATENT DOCUMENTS

| CN | 103543700 B | 8/2016 |
| EP | 1 814 045 A2 | 8/2007 |

(Continued)

OTHER PUBLICATIONS

Rockwell Automation. The Power of Collaboration Working for you: PartnerNetwork Solutions from Rockwell Automation; Win-911 Software; Publication ENCOMP-BR007B-EN-P—Dec. 2013.
(Continued)

*Primary Examiner* — Yves Dalencourt
(74) *Attorney, Agent, or Firm* — Amin, Turocy & Watson, LLP

(57) ABSTRACT

An automated industrial notification platform creates a link between a given industrial asset and one or more people or support entities qualified to provide support for the asset. An industrial device or machine stores electronic expert tag information that records and catalogs one or more support people or entities to be notified in response to detection of various types of performance or maintenance issues. The tag can include the experts' identities, contact information, roles relative to the industrial asset, event priorities, and other relevant information. Since the tag is stored in a memory
(Continued)

location of the industrial asset, the tag travels with the asset so that experts are globally associated with the asset regardless of the asset's location. Notification components integrated with the industrial asset detect conditions that may require expert assistance, and send an automated notification to one or more experts identified by the tag information.

20 Claims, 20 Drawing Sheets

(51) Int. Cl.
*G05B 23/02* (2006.01)
*G06Q 10/06* (2012.01)

(52) U.S. Cl.
CPC ..... *G05B 2219/24086* (2013.01); *Y02P 90/86* (2015.11); *Y04S 10/54* (2013.01)

(56) References Cited

U.S. PATENT DOCUMENTS

| | | | |
|---|---|---|---|
| 6,002,406 A | 12/1999 | Zhao | |
| 6,334,124 B1 | 12/2001 | Bouchard et al. | |
| 6,583,794 B1 | 6/2003 | Wattenberg | |
| 6,788,315 B1 | 9/2004 | Kekic et al. | |
| 7,612,661 B1* | 11/2009 | Johnson | G05B 19/4184 340/531 |
| 8,285,744 B2 | 10/2012 | Dorgelo et al. | |
| 8,453,091 B1 | 5/2013 | Rao et al. | |
| 8,489,641 B1 | 7/2013 | Seefeld et al. | |
| 8,819,149 B2 | 8/2014 | Amidon et al. | |
| 8,886,153 B2 | 11/2014 | Velusamy | |
| 9,069,382 B1 | 6/2015 | Starner et al. | |
| 9,213,714 B1 | 12/2015 | Ording | |
| 9,237,141 B2* | 1/2016 | Logue | H04L 63/0884 |
| 9,438,648 B2 | 9/2016 | Asenjo et al. | |
| 9,709,978 B2 | 7/2017 | Asenjo et al. | |
| 9,937,577 B2 | 4/2018 | Daniel et al. | |
| 9,952,882 B2 | 4/2018 | Kuscher et al. | |
| 2002/0049775 A1 | 4/2002 | Friedrich et al. | |
| 2002/0158873 A1 | 10/2002 | Williamson | |
| 2004/0181549 A1* | 9/2004 | Pate | G05B 23/027 |
| 2005/0010307 A1 | 1/2005 | Dove et al. | |
| 2005/0023347 A1 | 2/2005 | Wetzel et al. | |
| 2005/0188376 A1 | 8/2005 | Matsumoto et al. | |
| 2005/0204315 A1 | 9/2005 | Knol et al. | |
| 2006/0161544 A1 | 7/2006 | Lee et al. | |
| 2006/0241792 A1 | 10/2006 | Pretlove et al. | |
| 2006/0271884 A1 | 11/2006 | Hurst | |
| 2007/0078824 A1 | 4/2007 | Dorgelo et al. | |
| 2008/0072180 A1 | 3/2008 | Chevalier et al. | |
| 2009/0077055 A1 | 3/2009 | Dillon et al. | |
| 2009/0085934 A1 | 4/2009 | Baier et al. | |
| 2009/0086021 A1 | 4/2009 | Baier et al. | |
| 2009/0088875 A1 | 4/2009 | Baier et al. | |
| 2009/0089225 A1 | 4/2009 | Baier et al. | |
| 2009/0112816 A1 | 4/2009 | Marlow | |
| 2009/0125796 A1 | 5/2009 | Day et al. | |
| 2009/0216341 A1 | 8/2009 | Enkerud et al. | |
| 2009/0307162 A1 | 12/2009 | Bui et al. | |
| 2009/0307255 A1 | 12/2009 | Park | |
| 2010/0016995 A1 | 1/2010 | Barat | |
| 2010/0082661 A1 | 4/2010 | Beaudreau | |
| 2011/0022198 A1 | 1/2011 | Plache et al. | |
| 2011/0119227 A1 | 3/2011 | Wang et al. | |
| 2011/0093188 A1 | 4/2011 | Barkai et al. | |
| 2011/0115816 A1 | 5/2011 | Brackney | |
| 2011/0298579 A1 | 12/2011 | Hardegger et al. | |
| 2011/0316884 A1 | 12/2011 | Giambalvo et al. | |
| 2012/0120070 A1 | 5/2012 | Baillot | |
| 2012/0233573 A1 | 9/2012 | Sullivan et al. | |
| 2012/0242648 A1 | 9/2012 | Baier et al. | |
| 2012/0249588 A1 | 10/2012 | Tison et al. | |
| 2012/0249741 A1 | 10/2012 | Maciocci et al. | |
| 2012/0254792 A1 | 10/2012 | Husoy et al. | |
| 2012/0259436 A1 | 10/2012 | Resurreccion et al. | |
| 2012/0314571 A1 | 12/2012 | Forssell | |
| 2013/0006395 A1 | 1/2013 | Plache et al. | |
| 2013/0031508 A1 | 1/2013 | Kodosky et al. | |
| 2013/0054573 A1 | 2/2013 | Snellman et al. | |
| 2013/0073400 A1 | 3/2013 | Heath | |
| 2013/0110978 A1 | 5/2013 | Gordon et al. | |
| 2013/0120449 A1 | 5/2013 | Ihara et al. | |
| 2013/0124253 A1 | 5/2013 | Cooper et al. | |
| 2013/0124465 A1 | 5/2013 | Pingel et al. | |
| 2013/0124613 A1 | 5/2013 | Plache et al. | |
| 2013/0125233 A1 | 5/2013 | Bush et al. | |
| 2013/0169681 A1 | 7/2013 | Rasane et al. | |
| 2013/0211546 A1 | 8/2013 | Lawson et al. | |
| 2013/0211559 A1 | 8/2013 | Lawson et al. | |
| 2013/0222373 A1 | 8/2013 | Weinstein et al. | |
| 2013/0246539 A1 | 9/2013 | Davis | |
| 2013/0083012 A1 | 10/2013 | Han et al. | |
| 2013/0257863 A1 | 10/2013 | Mikkelsen | |
| 2013/0275908 A1 | 10/2013 | Reichard | |
| 2013/0290899 A1 | 10/2013 | Amran | |
| 2014/0032849 A1 | 1/2014 | De Vleeschauwer et al. | |
| 2014/0047064 A1 | 2/2014 | Maturana et al. | |
| 2014/0047106 A1 | 2/2014 | Leung et al. | |
| 2014/0047107 A1 | 2/2014 | Maturana et al. | |
| 2014/0143395 A1 | 5/2014 | Geltner et al. | |
| 2014/0207870 A1 | 7/2014 | Vaya | |
| 2014/0240356 A1 | 8/2014 | Cupitt et al. | |
| 2014/0250377 A1 | 9/2014 | Bisca et al. | |
| 2014/0253588 A1 | 9/2014 | Mandala | |
| 2014/0258940 A1 | 9/2014 | Han et al. | |
| 2014/0282215 A1 | 9/2014 | Grubbs et al. | |
| 2014/0316540 A1 | 10/2014 | Loncar et al. | |
| 2014/0335480 A1 | 11/2014 | Asenjo et al. | |
| 2014/0336785 A1 | 11/2014 | Asenjo et al. | |
| 2014/0358256 A1 | 12/2014 | Billi et al. | |
| 2015/0077555 A1 | 3/2015 | Scalisi | |
| 2015/0146007 A1 | 5/2015 | Dusik et al. | |
| 2015/0213465 A1 | 7/2015 | Noyes et al. | |
| 2015/0281329 A1 | 10/2015 | Dimov | |
| 2015/0371455 A1 | 12/2015 | Abdel-Rahman et al. | |
| 2016/0103750 A1 | 4/2016 | Cooper et al. | |
| 2016/0127690 A1 | 5/2016 | Kaehler et al. | |
| 2016/0132538 A1 | 5/2016 | Bliss et al. | |
| 2016/0132595 A1 | 5/2016 | Bliss et al. | |
| 2016/0176724 A1 | 6/2016 | Ji et al. | |
| 2016/0217381 A1 | 7/2016 | Bloomquist et al. | |
| 2016/0226731 A1 | 8/2016 | Maroulis | |
| 2016/0267759 A1 | 9/2016 | Kerzner | |
| 2016/0274553 A1 | 9/2016 | Strohmenger et al. | |
| 2016/0292895 A1 | 10/2016 | Billi et al. | |
| 2016/0337289 A1 | 11/2016 | Duca et al. | |
| 2016/0337441 A1 | 11/2016 | Bloomquist et al. | |
| 2016/0343163 A1 | 11/2016 | Venkatesha et al. | |
| 2017/0053445 A1 | 2/2017 | Chen et al. | |
| 2017/0060379 A1 | 3/2017 | Capozella et al. | |
| 2017/0091607 A1 | 3/2017 | Emeis et al. | |
| 2017/0108838 A1 | 4/2017 | Todeschini et al. | |
| 2017/0116259 A1 | 4/2017 | Elliot et al. | |
| 2017/0270362 A1 | 9/2017 | Barnehama et al. | |
| 2017/0300753 A1 | 10/2017 | Billi et al. | |
| 2017/0337352 A1 | 11/2017 | Williams | |
| 2018/0054432 A1 | 2/2018 | Bailey et al. | |

FOREIGN PATENT DOCUMENTS

| | | |
|---|---|---|
| EP | 1906289 | 4/2008 |
| EP | 2077473 | 7/2009 |
| EP | 2592812 | 5/2013 |
| EP | 2801935 | 11/2014 |
| EP | 2 927 854 A1 | 10/2015 |
| EP | 2 942 717 A1 | 11/2015 |
| EP | 2940544 | 11/2015 |
| EP | 3 018 597 A1 | 5/2016 |
| EP | 3 037 901 A2 | 6/2016 |
| EP | 3032480 | 6/2016 |

(56) References Cited

FOREIGN PATENT DOCUMENTS

| JP | 2008-201101 A | 9/2008 |
|---|---|---|
| JP | 2016-010145 A | 1/2016 |
| WO | 2016/057386 A1 | 4/2016 |

OTHER PUBLICATIONS

Extended European Search Report for European Application Serial No. 17200391.5 dated Jan. 18, 2018, 7 pages.
Communication Pursuant to Article 94(3) EPC Received for EP Patent Application No. 16161305.4 dated Sep. 8, 2017, 7 pages.
Extended European Search Report for EP Patent Application Serial No. 17178556.1-1871 dated Aug. 23, 2017, 10 pages.
Extended European Search Report for EP Patent Application Serial No. 17186540.5-1958 dated Sep. 28, 2017, 8 pages.
European Office Action for EP Patent Application Serial No. 16196582.7, dated May 9, 2017, 2 pages.
Final Office Action for U.S. Appl. No. 14/675,129, dated Dec. 1, 2017, 63 pages.
Office Action for U.S. Appl. No. 14/928,305, dated Dec. 22, 2017, 24 pages.
Extended European Search Report for EP Patent Application Serial No. 16161305.4, dated Sep. 5, 2016, 10 pages.
European Office Action for EP Patent Application Serial No. 16161305.4, dated Oct. 10, 2016, 2 pages.
Office Action for U.S. Appl. No. 15/241,354 dated Jan. 24, 2018, 95 pages.
Microsoft HoloLens demo onstage at BUILD 201, https://www.youtube.com/watch?v=3AADEqLIALk, 2 pages.
European Office Action for EP Patent Application Serial No. 16196582.7, dated Feb. 14, 2018, 7 pages.
European Office Action for EP Patent Application Serial No. 17150085.3, dated Dec. 19, 2017, 5 pages.
Extended European Search Report for EP Patent Application Serial No. 17178555.3 dated Jan. 8, 2018, 73 pages.
Extended European Search Report for EP Patent Application Serial No. 17150085.3-1802 dated May 10, 2017, 8 pages.
Non-Final Office Action for U.S. Appl. No. 14/675,129, dated May 4, 2017, 58 pages.
European Office Action for European Patent Application Serial No. 16196582.7-1871 dated Jan. 31, 2017, 9 pages.
Non-Final Office Action for U.S. Appl. No. 15/391,213, dated May 9, 2018, 79 pages.
Communication pursuant to Rule 69 EPC for EP Patent Application Serial No. 17186540.5 dated Apr. 4, 2018, 2 pages.
Communication pursuant to Rule 69 EPC for EP Patent Application Serial No. 17178556.1 dated Feb. 26, 2018, 2 pages.
Communication pursuant to Rule 69 EPC for EP Patent Application Serial No. 17178555.3 dated Feb. 26, 2018, 2 pages.
Extended European Search Report for European Application Serial No. 17200575.3 dated Apr. 17, 2018, 8 pages.
Extended European Search Report for European Application Serial No. 17200580.3 dated Apr. 17, 2018, 8 pages.
Chinese Office Action for Chinese Application Serial No. 201610187424.2 dated Mar. 9, 2018, 6 pages.
Non-Final Office Action received for U.S. Appl. No. 15/170,676, dated May 24, 2018, 163 pages.
Communication pursuant to Rule 69 EPC for EP Patent Application Serial No. 17200575.3 dated May 22, 2018, 2 pages.
Communication pursuant to Rule 69 EPC for EP Patent Application Serial No. 17200580.3 dated May 22, 2018, 2 pages.
Final Office Action received for U.S. Appl. No. 14/928,305 dated Jun. 5, 2018, 16 pages.
Final Office Action received for U.S. Appl. No. 15/241,354, dated Jul. 11, 2018, 80 pages.
Non-Final Office Action received for U.S. Appl. No. 15/240,161, dated Jul. 27, 2018, 54 pages.
Final Office Action for U.S. Appl. No. 15/391,213, dated Oct. 25, 2018, 67 pages.
Non-Final Office Action for U.S. Appl. No. 14/928,305, dated Dec. 31, 2018, 19 pages.
Non-Final Office Action for U.S. Appl. No. 15/391,260, dated Nov. 30, 2018, 78 pages.
Final Office Action received for U.S. Appl. No. 15/170,676, dated Dec. 26, 2018, 46 pages.
Non-Final Office Action for U.S. Appl. No. 15/718,907, dated Dec. 14, 2018, 75 pages.
Non-Final Office Action for U.S. Appl. No. 15/465,246 dated Jan. 24, 2019, 411 pages.
Communication pursuant to Rule 94(3) EPC for EP Patent Application No. 17186540.5 dated Feb. 21, 2019, 5 pages.
Non-Final Office Action for U.S. Appl. No. 15/718,856 dated Mar. 5, 2019, 68 pages.

* cited by examiner

| EXPERT TAG INFORMATION | | | |
|---|---|---|---|
| EVENT CATEGORY | EXPERT COMPANY | EXPERT NAME | CONTACT INFORMATION |
| OPERATIONAL FAULT | <PLANT FACILITY> | <EXPERT NAME 1> | <CONTACT INFORMATION 1> |
| DOWNTIME FAULT – MECHANICAL | <SYSTEMS INTEGRATOR NAME> | <EXPERT NAME 2> | <CONTACT INFORMATION 2> |
| DOWNTIME FAULT – MECHANICAL | <OEM NAME> | <EXPERT NAME 3> | <CONTACT INFORMATION 3> |
| DOWNTIME FAULT – SOFTWARE | <PLANT FACILITY> | <EXPERT NAME 4> | <CONTACT INFORMATION 4> |
| DOWNTIME FAULT – SOFTWARE | <SYSTEMS INTEGRATOR NAME> | <EXPERT NAME 5> | <CONTACT INFORMATION 5> |
| NON-CRITICAL FAULT – SOFTWARE | <PLANT FACILITY> | <EXPERT NAME 6> | <CONTACT INFORMATION 6> |
| NON-CRITICAL FAULT – SOFTWARE | <SYSTEMS INTEGRATOR NAME> | <EXPERT NAME 7> | <CONTACT INFORMATION 7> |
| MAINTENANCE EVENT | <PLANT FACILITY> | <EXPERT NAME 8> | <CONTACT INFORMATION 8> |
| ... | | ... | ... |

FIG. 4

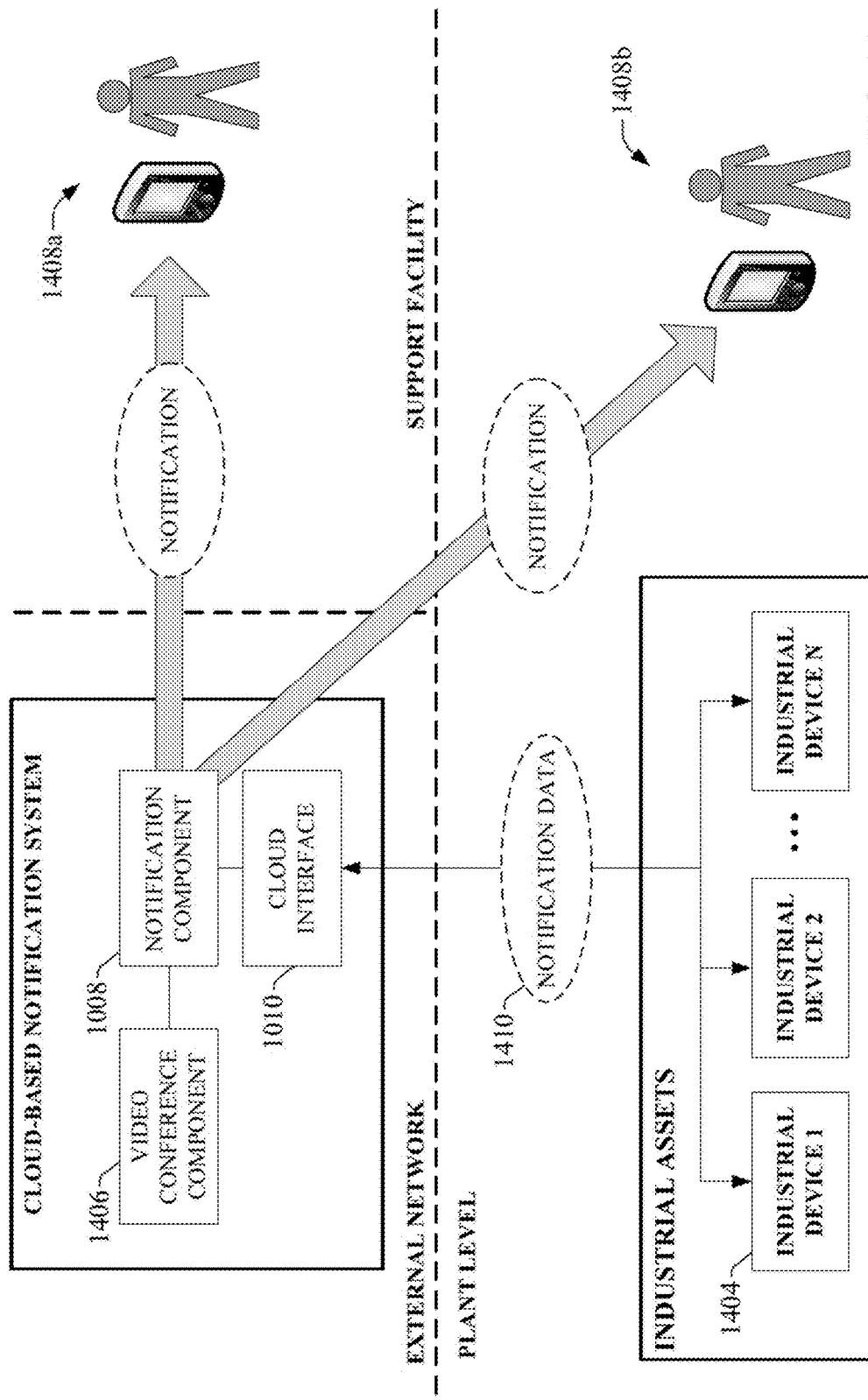

DELIVERY OF AUTOMATED NOTIFICATIONS BY AN INDUSTRIAL ASSET

BACKGROUND

The subject matter disclosed herein relates generally to industrial automation systems, and, more particularly, to an automated notification system that supports creation of an association between an industrial asset and a set of qualified support people capable of providing service for the asset.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an industrial device is provided, comprising an event identification component configured to detect a condition of the industrial device for which a notification is to be generated; a notification component configured to determine at least one recipient for the notification based on expert tag information stored on the memory, and to generate notification information based on the condition; and a communication component configured to initiate a sending of the notification information to the at least one recipient via an external network.

Also, one or more embodiments provide a method for generating automated notifications, comprising detecting, by a system comprising at least one processor, occurrence of an event associated with an industrial device; determining, by the system, at least one recipient to be notified of the event based on expert tag information stored on the industrial device; generating, by the system, notification information based on the event; and sending, by the system, the notification information to the at least one recipient via an external network.

Also, according to one or more embodiments, a non-transitory computer-readable medium is provided having stored thereon instructions that, in response to execution, cause a system to perform operations, the operations comprising, determining that an event associated with an industrial device has occurred for which a notification is to be generated; referencing expert tag information stored on the industrial device based on the event; selecting one or more recipients for the notification based on the referencing; generating the notification based on the event and device information included in the expert tag information; and initiating a sending of the notification to the one or more recipients.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 4 is an example expert tag.

FIG. 14A is a diagram illustrating delivery of notifications to two recipients by a cloud-based notification system that supports video conferencing between a remote expert and a local plant employee.

DETAILED DESCRIPTION

Figure 1:
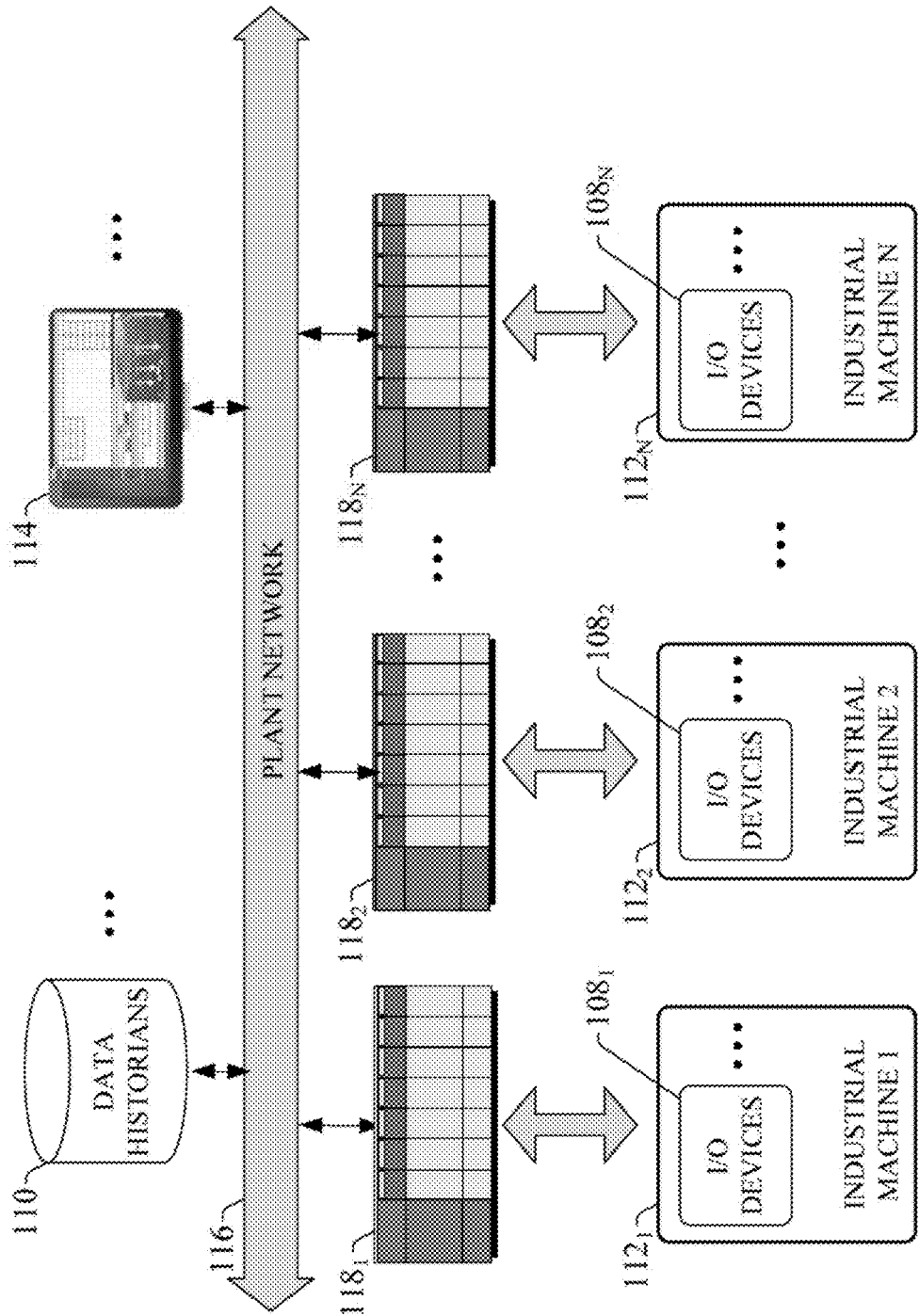
FIG. 1 is a diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Modern industrial enterprises are reliant on a large number of industrial assets that are crucial to the productive and financial goals of the enterprise. These assets include, for example, industrial machines that carry out manufacturing processes, the industrial controllers and associated I/O devices that control those machines, any peripheral systems or devices that participate in the machine control or quality verification processes (e.g., vision systems, quality check systems, industrial safety systems, motor drives, etc.), and other such assets.

FIG. 1 is a diagram of an example industrial control environment. In this example, a number of industrial machines 112 are deployed throughout the plant to carry out one or more industrial processes relating to product manufacture, machining, motion control, batch processing, material handling, or other such industrial functions. The industrial machines 112 are controlled by respective industrial controllers 118, which interact with a number of I/O devices 108 associated with the machines. The industrial controllers 118 typically execute respective control programs to facilitate monitoring and control of their respective machines via the I/O devices 108. The control programs executed by industrial controllers 118 can comprise any conceivable type of code used to process input signals read from the I/O devices 108 and to control output signals generated by the industrial controllers, including but not limited to ladder logic, sequential function charts, function block diagrams, or structured text.

I/O devices 108 may include both input devices that provide data relating to the controlled machines to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with I/O devices 108 over hardwired or networked connections. For example, industrial controllers 118 can be equipped with native hardwired inputs and outputs that communicate with the I/O devices 108 to effect control of the machines 112. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with I/O devices 108 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. Some controllers may also support hardwired point-to-point communication (e.g. Highway Addressable Remote Transducer, or HART, protocol) that allows the controllers to pass digital information serial over a hardwired link. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Other industrial assets can include, for example, one or more human-machine interfaces 114 that allow plant personnel to view telemetry and status data associated with the industrial machines 112, and to control some aspects of system operation. HMIs 114 may communicate with one or more of the industrial controllers 118 over a wired or wireless plant network 116 or via a direct communication cable, and exchange data with the industrial controllers to facilitate visualization of information relating to the controlled industrial systems on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Other industrial assets may not be directly involved in the control of industrial machines 112, but may perform related peripheral functions. For example, one or more data historians 110 may reside on the plant network 116, and serve to aggregate and store operational and/or production information collected from the industrial controllers 118 or other data sources. This stored data can be retrieved and viewed by plant personnel, or leveraged by reporting applications to generate production reports.

For a given industrial machine, device, or collection of industrial assets within an industrial enterprise, there is often a limited set of people with special expertise in operating or maintaining those assets. This is especially true of custom-built machines, such as those built by an original equipment manufacturer (OEM) according to specifications provided by an end user. Consequently, when these assets experience a fault condition, identifying the most suitable people to respond to the fault condition can be a difficult task. Moreover, if an expert is located off-premise (as is often the case with OEMs), the end user may experience difficulty locating and contacting the most suitable people for addressing a machine issue. Also, if the fault is discovered and reported by a person with little or no understanding of the asset's operation, accurately conveying the information required by the expert to perform an initial diagnosis of the problem presents another challenge.

Another complication arises if a machine or other industrial asset changes location within the plant. For example, a particular industrial asset may initially be located in a first production area, where troubleshooting and maintenance of the asset is performed by maintenance personnel associated with that production area. If the asset is relocated to a different production area, maintenance personnel assigned to that work area may not have the same level of knowledge and expertise with regard to maintenance of the asset. Although the original team of maintenance personnel may still be available within the plant to assist with asset performance issues, the new maintenance personnel may not have immediate knowledge of which maintenance personnel were originally responsible for the asset. A similar problem arises if the industrial asset changes ownership, which involves not only relocating the asset but also placing the asset under the supervision of new personnel with no previous experience in the operation and maintenance of the machine.

To address these and other issues, one or more embodiments of the present disclosure provide an automated industrial notification platform that creates a permanent link between a given industrial asset and one or more people or entities capable of providing service for the asset. To this end, an industrial asset or machine include a means for recording an association between the asset and one or more relevant people or entities who have sufficient understanding of the machine to provide service or advice. This association can be created, for example, by creating and maintaining a digital tag that resides on the industrial asset. The tag can include the experts' identities, contact information, roles relative to the industrial asset or machine (e.g., OEM, maintenance person, system integrator, operator, etc.) and other relevant information. Since the tag is stored in a memory location associated with the asset, the tag travels with the industrial asset so that the experts are globally associated with the machine regardless of the location of the asset. The tags allow an industrial machine or device to be associated with users or companies across different enterprises, including the machine builder (e.g., the OEM), local maintenance people or engineers at the customer site, system integrators involved with the installation and integration of the machine into the customer's larger industrial system, etc.

The digital tag works in conjunction with automated diagnostic and notification components integrated into the industrial machine or device. These components automatically detect conditions that may require expert assistance, such as a downtime condition, an operational inefficiency, an alarm condition, or other such conditions. In response to detection of a condition requiring service or attention, the asset's automated notification components access the tagged information and determine one or more suitable experts or expert entities based on the type of the detected issue. In some embodiments, the system may consider additional factors in connection with determining the suitable experts, including but not limited to the time of the detected condition, the current location of the industrial machine or device, or other such considerations. The notification components then send one or more notifications to a personal device associated with the selected experts based on contact information recorded on the digital tag. The notification can include relevant information about the issue, including the current location of the asset, the specifics for the detected issue, or other such information.

In some embodiments, rather than maintaining the expert information on the industrial asset itself, the expert information for the asset and associated notification components can be maintained on a separate server device or on a cloud platform. In such embodiments, in response to detection of a service issue, the industrial asset can send a message to the server or cloud-based notification system identifying the asset and the nature of the service issue. The notification system on the server or cloud platform can then access the expert information for the identified asset and determine the appropriate experts based on the nature of the issue and other relevant information (e.g., the time of day, the current location of the machine and/or the respective candidate experts, etc.).

Figure 2:
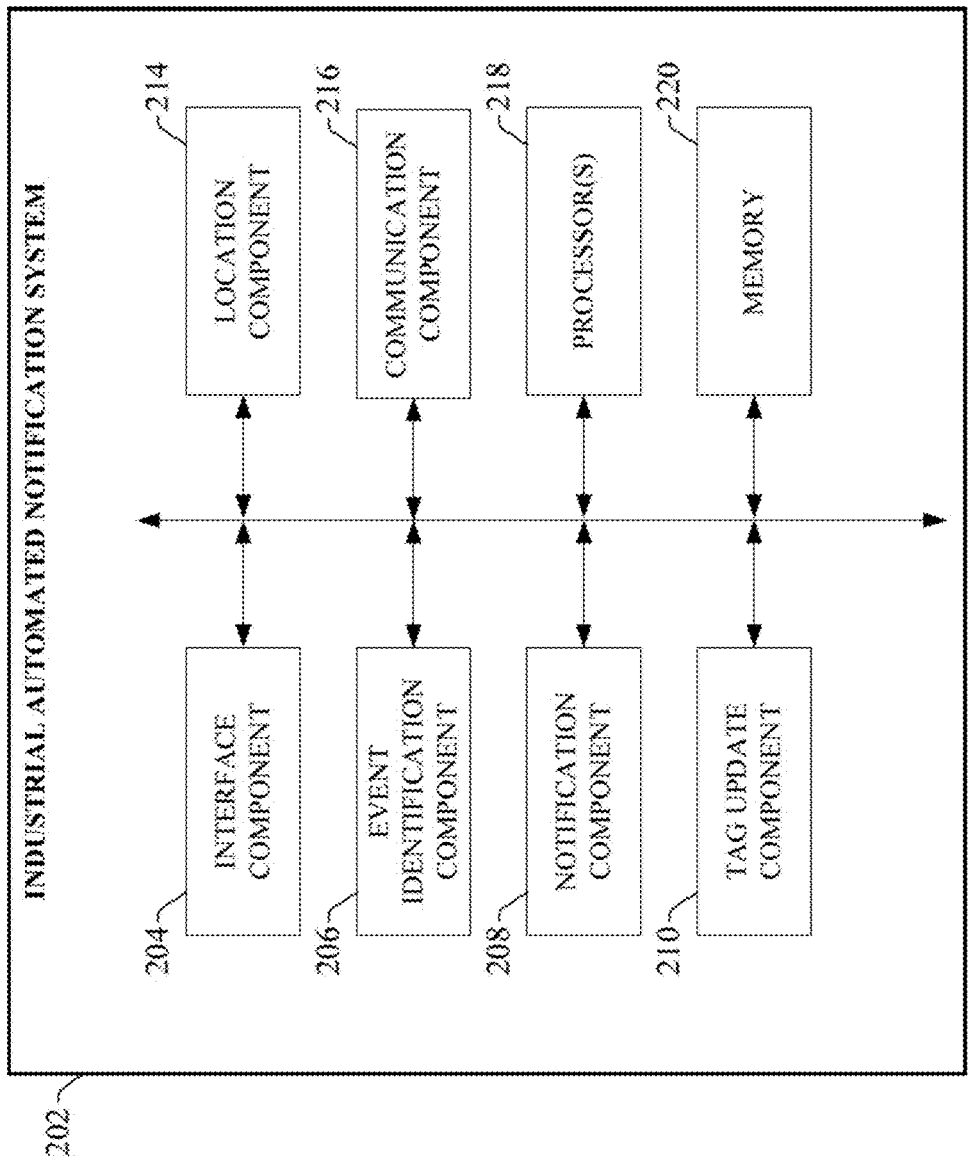
FIG. 2 is a block diagram of an example industrial automated notification system.

FIG. 2 is a block diagram of an example industrial automated notification system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial automated notification system 202 can include an interface component 204, an event identification component 206, a notification component 208, a tag update component 210, a location component 214, a communication component 216, one or more processors 218, and memory 220. In various embodiments, one or more of the interface component 204, event identification component 206, notification component 208, tag update component 210, location component 214, communication component 216, the one or more processors 218, and memory 220 can be electrically and/or communicatively coupled to one another to perform one or more of the functions of the industrial automated notification system 202. In some embodiments, components 204, 206, 208, 210, 214, and 216 can comprise software instructions stored on memory 220 and executed by processor(s) 218. Industrial automated notification system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

In various embodiments, the components of industrial automated notification system 202 can be integrated components of an industrial machine, device, or other asset. For example, in some embodiments, industrial automated notification system 202 can be implemented on an industrial controller, a motor drive (e.g., a variable frequency drive or other type of motor drive), a meter or other telemetry device, an HMI terminal, a vision system, a barcode stamper or reader, a computing component of an industrial machine, or other such industrial asset. Alternatively, some or all of the components of industrial automated notification system 202 can reside separately from the industrial asset(s) for which service notifications are to be delivered. In such embodiments, the automated notification system may reside and execute on a cloud-platform, on a web server, on a local server, or other such platform.

Interface component 204 can be configured to receive user input and to render output to the user in any suitable format (e.g., visual, audio, tactile, etc.). User input can be, for example, expert registration information that identifies an expert to be associated with the industrial asset, as well as other relevant information about the expert and/or conditions under which the expert is to be notified. The expert registration information can include, for example, contact information for the expert, a type of issue for which the expert is to be notified, a time during which the expert may be notified, a company with which the expert is affiliated, or other such information.

Event identification component 206 can be configured to monitor for and identify conditions of the industrial asset for which expert assistance may be warranted. For example, the event identification component 206 may be configured to monitor statuses of the industrial asset—e.g., alarm conditions, performance data generated by the asset during operation, etc.—and identify when one or more of the monitored statuses satisfies a condition indicative of a performance issue for which a notification is to be generated. These detected notification conditions can include, but are not limited to, alarm statuses indicating a downtime condition or other type of fault with the industrial asset, a deviation of a key performance indicator from a defined acceptable range, or other such conditions.

Notification component 208 can be configured to generate notification information directed to one or more experts or expert entities in response to detection of a notification event (by event identification component 206). The recipient(s) and content of the notification information can be based on the type of issue identified by the event identification component 206, a scheduled availability of the candidate experts, a location of the candidate experts relative to the industrial asset, a time of day, or other contextual information. The notification component 208 can determine one or more recipients for the notification based on expert information stored on a digital tag or other type of information storage object. Once the notification information has been generated and suitable recipients identified, the notification component 208 can initiate sending the notification information to client devices associated with the selected recipients.

Tag update component 210 can be configured to store, maintain, and update expert information in a memory location associated with the industrial asset, or in a centralized storage location such as cloud-based storage or server memory. Location component 214 can be configured to identify a location of the industrial asset, which can be leveraged by the notification system to determine one or more suitable experts for a given issue based in part on the location of the asset (e.g., a geographical location, a plant in which the asset resides, a work area within the plant, etc.). The communication component 216 can be configured to wirelessly communicate with one or more external networks and/or devices in connection with delivering notifications and service requests to expert personnel. For example, in one or more embodiments, the communication component 216 can be configured to exchange information with a communication infrastructure via an external network such as the Internet or a telephone network, in order to send notification information to a client device or account associated with a user (e.g., a personal phone, an email account, a wearable computer, etc.). In other embodiments, communication component 216 can be configured to communicate with devices over a local wireless network within the plant facility in which the industrial asset resides.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
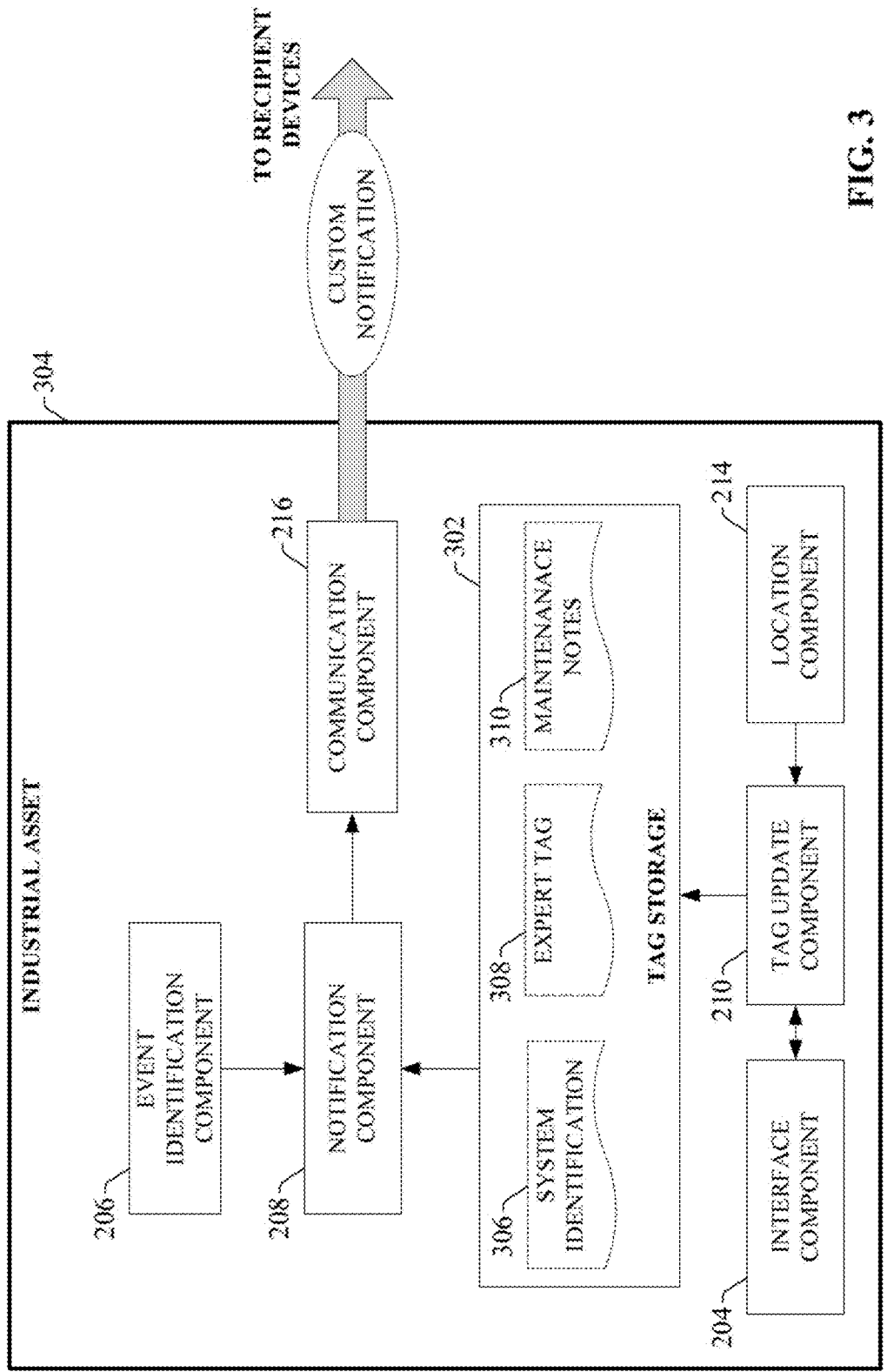
FIG. 3 is block diagram of an industrial asset that includes an integrated automated notification system.

FIG. 3 is block diagram of an industrial asset 304 that includes an integrated automated notification system. Industrial asset 304 can comprise, for example, an industrial device such as an industrial controller, an HMI terminal, a motor drive, a vision system or other quality verification system, a sensor, a telemetry device, or other such device. Industrial asset 304 may also comprise an industrial machine comprising multiple industrial devices and components (e.g., a machine or production line under the control of an industrial controller and associated I/O devices). According to one or more embodiments, the industrial asset 304 can store asset-specific information in a tag storage area 302, which can comprise a computer-readable storage medium of the industrial asset (e.g., flash storage or another type of data storage medium).

The tag storage area 302 can store system identification information 306 that uniquely identifies the industrial asset for the purpose of generating automated notifications. The system identification information 306 can comprise, for example, one or more of a user-defined name for the industrial asset 304, a vendor-defined device or asset type identifier (e.g., a vendor and model number of the industrial asset), or other relevant information. In some embodiments, system identification information 306 can also comprise contextual information relating to a location or function of the industrial asset 304. This contextual information may include, for example, a customer identifier that identifies the owner of the asset (e.g., the industrial enterprise, company, etc.), a production area or workcell in which the industrial asset resides, a role of the industrial asset within a particular industrial enterprise (e.g., control of an identified machining tool, leak test verification of a die cast engine block, etc.), or other such information.

The tag storage area 302 can also store an expert tag 308 that identifies one or more people or business entities qualified to provide assistance for the industrial asset 304. In addition to identifying the relevant experts, the expert tag 308 also classifies each expert according to the type of event or issue the expert is qualified to address. FIG. 4 illustrates an example set of information that can be recorded in the expert tag 308. In this example, the expert tag information identifies multiple event categories 402, each identifying a type of event that, when detected by the event identification component 206, will initiate delivery of one or more notifications to relevant experts identified by the expert tag 308. Event categories defined in the present example include operational faults, mechanical downtime faults, software downtime faults, non-critical software faults, and scheduled maintenance events.

The expert tag information associates each event category 402 with one or more experts 406 qualified to address the event type, as well as contact information 408 used by the system to determine how the notification should be delivered to the expert. In some embodiments, the expert tag information also identifies the company or business entity 404 with which the expert 406 is affiliated. Each item of contact information 408 can comprise any suitable type of information that can be used by the system to identify a destination communication node for the notification, including but not limited to a phone number (for delivery of text-based notifications or pre-recorded voice notifications), email addresses, a pager number, a web site or social media page to which a notification can be posted, or other such contact information.

In some embodiments, the expert tag information may also allow priority levels to be assigned to respective event categories. In such embodiments, the system may use the priority level information to determine how and/or when one or more recipients are to be contacted in response to detection of an event. For example, if an event having a low priority level is detected at a time when a candidate recipient is listed as unavailable (e.g., non-working hours), the system may defer delivery of the notification until the current time falls within the available time range for the recipient (e.g., when the working hours for the recipient begin). Alternatively, if an event having a high priority is detected, the system may send the notification immediately regardless of the current time. In addition to controlling the time at which notifications are sent, the defined priority level may also determine how the recipient is notified. For example, detection of a low priority event may cause the system to send a text message or an email notification to the recipient, while detection of a high priority event may cause the system to send both a text message and an automated phone call.

Figure 5:
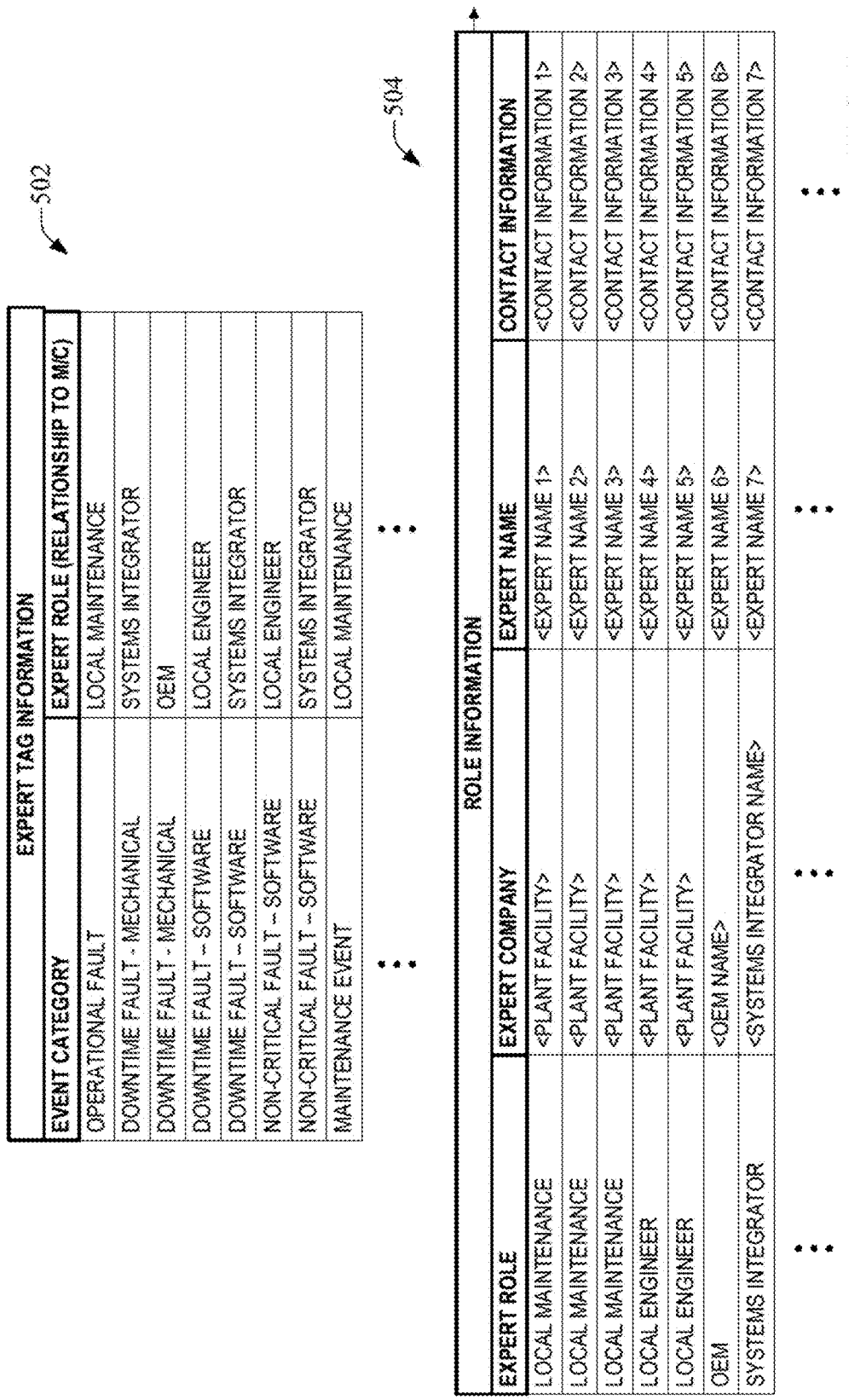
FIG. 5 is an example expert tag in which expert tag information is organized into separate information tables.

In some embodiments, in order to more easily maintain accurate associations between event categories and relevant experts capable of providing assistance for the respective event types, the expert tag information can be organized into separate information tables, as shown in FIG. 5. In this example, a first table 502 defines associations between event types and expert roles qualified to provide assistance for each event type. For example, as defined in table 502, operational faults are to be handled by local maintenance personnel (that is, on-premise maintenance personnel directly employed by the plant facility), while mechanical downtime faults are to be handled by one or both of a systems integrator who installed the industrial asset on behalf of the owner and/or an OEM who built the industrial asset for the owner. Software downtime faults are to be handled by a local engineer (an engineer directly employed by the plant facility) or a systems integrator. Non-critical software faults are to be handled by either a local engineer or a systems integrator, and a scheduled maintenance event is to be handled by local maintenance personnel.

A second table 504 linked to table 502 associates each defined expert role with one or more experts having that role. Example table 504 defines three local maintenance experts associated with the local plant facility, two local engineers, one OEM, and one systems integrator. By separating the expert tag information in this manner, new experts can be added to a particular expert role using table 504, and those newly added experts will automatically be linked to the appropriate event categories for notification purposes by virtue of table 502. It is to be appreciated that the separate information tables depicted in FIG. 5 are only intended to be exemplary, and that the expert tag information can be segregated into any number of tables according to any suitable data table layout. For example, table 502 may also include a priority level data field that allows each even category to be associated with a priority level, which determines how and/or when notifications relating to a given event are delivered, as described above.

It is to be appreciated that the example expert tag information format depicted in FIGS. 4 and 5 are only intended to be exemplary, and that any suitable format for associating experts and their associated contact information with specified types of notification events is within the scope of one or more embodiments of this disclosure. Moreover, the expert tag information may include other information not illustrated in FIGS. 4 and 5, and which may be leveraged by the system to determine which experts should be contacted and how those experts should be notified. For example, for a given event category, the tag information may identify multiple experts categorized according to respective times of day or days of the week. This may be useful when different experts are known to be available at different times of day or days of the week. In such embodiments, when an event is detected, the time and/or day at which the event was detected is noted by the system, and the one or more experts corresponding to both the event type and the time/day are selected for notifications. In some embodiments, the times at which the notification are sent may also be a function of a priority or complexity level assigned to the event type in the expert tag information.

Returning now to FIG. 3, tag storage area 302 can also include a record of maintenance notes 310 relating to the industrial asset 304. In one or more embodiments, maintenance notes 310 comprises a record of maintenance or engineering interactions with the industrial asset 304, which may be useful to personnel performing diagnosis or maintenance on the industrial asset during a downtime event or other operational issue. Maintenance notes 310 can include, for example, a record of a maintenance or engineering action performed on the industrial asset (e.g., replacement of an identified machine part or industrial device, reprogramming of a portion of an industrial control program, a scheduled service operation, etc.), steps taken to solve previous operational issues, estimated time to correct previous issues, identification of device documentation that was referenced to solve a previous issue, version history information documenting a history of software or firmware versions installed on the asset (e.g., times and dates that previously installed firmware or software versions were installed), etc. At least a portion of these maintenance notes may be sent or made available to a notified expert in connection with an event notification.

Information maintained in tag storage area 302—including the system identification information 306, expert tag 308, and maintenance notes 310—can be updated manually based on input provided by the user via the interface component 204, or dynamically by the industrial asset 304 based on detected conditions, events, or changes of status. Updates to the tag storage area 302 can be managed by a tag update component 210, which modifies selected sets of the tag information based on one or both of user input or automatically detected status changes or events.

With regard to manual updating of tag information, the interface component 204 can be configured to provide access to selected subsets of the tag information maintained in tag storage area 302. In one or more embodiments, interface component 204 can be configured to generate one or more configuration interface displays that provide access to the selected items of tag information, and serve these displays to a client device communicatively connected to the industrial asset over a wireless or hard-wired connection. The configuration interfaces may include one or more data entry fields corresponding to one or more items of tag data, allowing the user to modify the corresponding tag information. The configuration interfaces may also include interactive features that guide the user through the process of associating a particular event type to one or more expert entities, as well as configuring any additional information or criteria required to link a particular event or event type to a suitable expert (e.g., associating multiple different expert entities with a given event type, and defining a time period and/or day of the week for each expert entity defining the respective expected availabilities of each expert). The configuration interfaces can also allow the user to set the preferred contact information to be used to deliver notifications to the respective expert entities.

Since a given industrial asset may be associated with a particular set of event types that relate to that asset, the configuration options presented by the interface component 204 can be dependent on the type of the industrial asset 304. That is, the interface component 204 for a given industrial asset may be configured to present a selectable list of possible event types associated with that particular asset. For example, the interface component for a telemetry device—such as a pressure, temperature, or flow meter—may present a list of events including over value fault, under value fault, and read failure fault, while the interface component for a motor drive may present a list of events including overcurrent or undercurrent faults, overspeed or underspeed faults, overvoltage or undervoltage faults, etc. In this way, the user can easily review the event types for which expert information can be configured.

When the interface component 204 receives tag configuration information from the user (e.g., via the configuration interfaces), the tag update component 210 will update the appropriate items of tag information in accordance with the user's configuration input. The tag information can be updated as needed to reflect changes in the pool of experts qualified to perform maintenance services on the industrial asset. For example, when new personnel become qualified to work on industrial asset 304, when a previous expert is no longer available to work on the asset, or when an expert's contact information changes, information contained in the expert tag 308 can be updated to reflect the changes in order to maintain an accurate and current list of qualified personnel.

The industrial asset 304 can also update selected items of the tag information dynamically based on automatically detected device statuses or location changes. For example, location component 214 can be configured to determine a location of industrial asset 304, which can be used to update one or more items of the tag information. In one or more embodiments, location component 214 can determine a geographic location of the industrial asset 304 (e.g., in terms of geographic coordinates) using, for example, global positioning system (GPS) capabilities. In some embodiments, the system can cross-reference this geographic location with enterprise-specific location information in order to generate location information that may be more meaningful to the particular industrial enterprise in which the asset is used. For example, facility location information defining geographical locations of one or more plant facilities associated with an industrial enterprise may be stored on the industrial asset. This facility location information may comprise respective names of the industrial facilities (e.g., Marysville plant, southwest plant, etc.) as well as geographical coordinate information defining the locations of the respective facilities. Upon determining the current geographic location of the industrial asset 304, the location component 214 can cross-reference this asset location with the facility location information to determine whether the asset's current location corresponds to a location of one of the defined industrial facilities. If so, the tag information is updated to indicate that the asset 304 is currently located in the identified industrial facility.

In some embodiments, this technique can be used to determine the asset's location within an industrial enterprise at a more granular level. For example, in addition to the plant facility, the location component 214 can identify a particular work area—of a number of defined work areas—within the facility in which the asset 304 is currently located. In this way, the location component 214 can reference a hierarchical geographic model of an industrial enterprise that defines geographic locations of one or more plant facilities, work areas within those facilities, machines within those work areas, etc., in order to determine a location of the asset 304 within a custom-defined industrial context. The tag update component 210 can then set this location information as part of the tag information stored in the tag storage area 302. This location information can be leveraged by the notification system to determine one or more suitable experts for a given issue based in part on the location of the asset.

Other items of tag information can also be updated dynamically by internal asset components. For example, the tag update component 210 can be configured to automatically track software, firmware, or operating system version history for the industrial asset 304. Thus, when a maintenance person or engineer updates the firmware or other software on industrial asset 304, the tag update component 210 automatically updates the stored maintenance notes to record the date and time of the installation and the firmware/software version that was installed.

With the tag information configured and stored on the industrial asset, the customized expert definitions remain associated with the asset even if the asset is relocated to a different work area or plant facility, or sold to a different industrial enterprise. In this way, the pool of expertise and experience travels with the industrial asset, maintaining a link between the asset and the qualified personnel who have been involved with designing, installing, and/or maintaining the industrial asset in the past. Moreover, the structured nature of the tag information—whereby each defined expert is associated with a type of maintenance event, a location, a time of day, a day of week, etc.—provides a means for the industrial asset to select the appropriate set of experts for a given event scenario.

When the industrial asset 304 is deployed within an industrial environment, the event identification component 206 monitors operation of the asset 304 to identify conditions for which expert assistance may be warranted. For example, the event identification component 206 can detect when the industrial asset 304 has generated an alarm or fault, experienced a downtime condition, performed an out-of-sequence operation, or other such condition. If the industrial asset 304 is an industrial controller that monitors and controls operation of an industrial machine or process, the event detected by the event identification component 206 may relate to the controller's internal operation (e.g., a controller fault) or to the machine or process being controlled. In the latter scenario, the alarm or fault conditions associated with the controlled machine or process may be defined by the user as part of the control program being executed on the industrial controller. For example, process parameter setpoint values, abnormal machine statuses, process alarm conditions, and other such notifiable conditions may be defined by the user within the industrial control program, and such conditions will be detected by the event identification component 206 and used as the basis for a notification trigger.

Other types of industrial assets, such as telemetry devices, motor drives, etc., may have a different set of associated notifiable conditions that will be monitored by the event identification component 206. For example, the event identification component 206 for a motor drive (e.g., a variable frequency drive or other type of drive) may monitor internal drive abnormals, including but not limited to overcurrent or undercurrent faults, overspeed or underspeed faults, overvoltage or undervoltage faults, etc.

Figure 6:
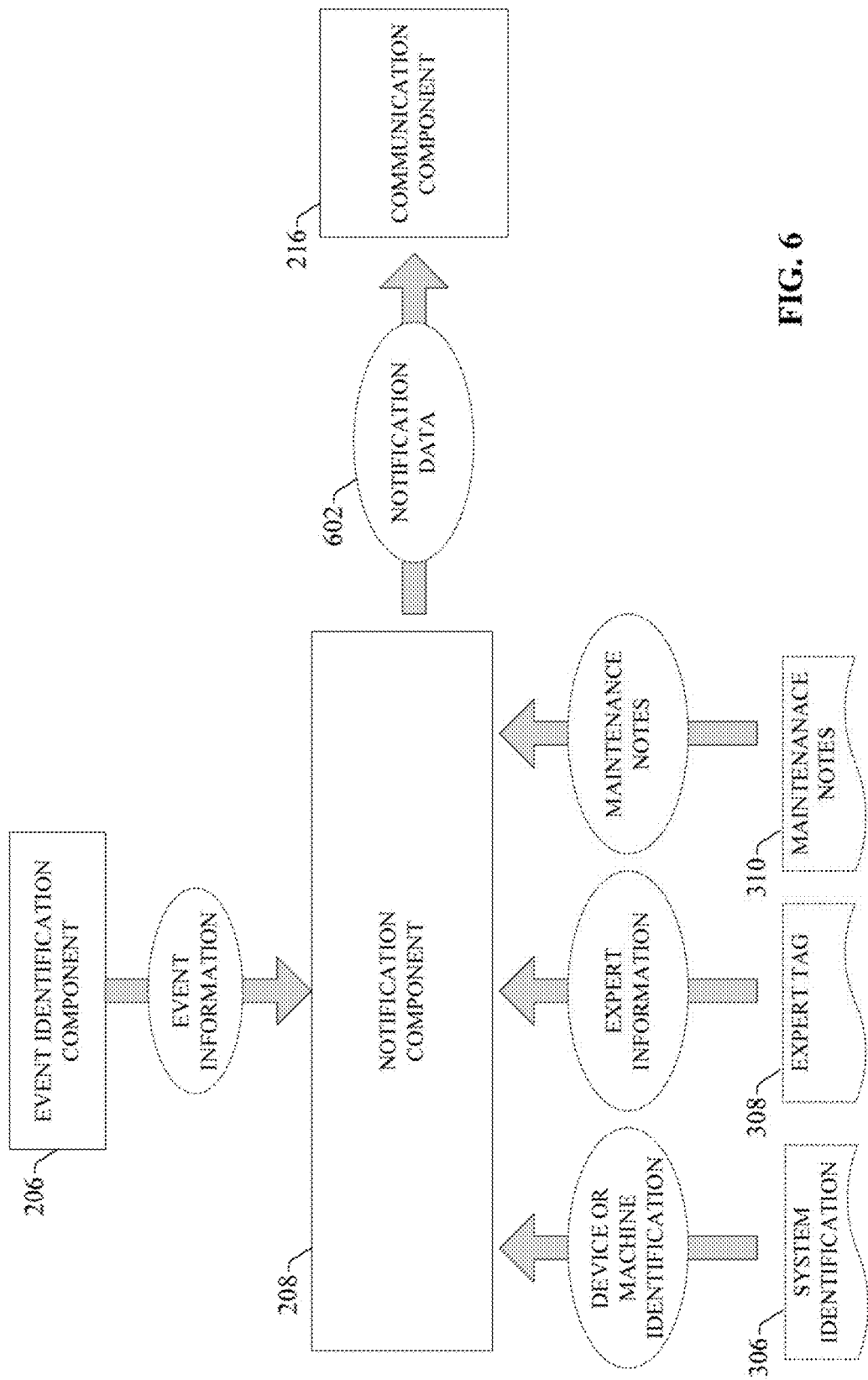
FIG. 6 is a diagram illustrating the data collected by a notification component in connection with generating a notification in response to receiving event information from an event identification component.

In response to detection of an event falling under a notifiable category (as defined by the tag information in tag storage area 302), the event identification component 206 provides an indication of the event to the notification component 208. FIG. 6 is a diagram illustrating the data collected by the notification component 208 in connection with generating a notification in response to receiving event information from the event identification component 206. Upon detection of a notifiable event, the event identification component 206 provides event information describing the event to the notification component 208. The event information may include, for example, an identification of the detected event or a category of the event, a time at which the event occurred, or other relevant information. Based on the event information provided by the event identification component 206, the notification component 208 references or retrieves appropriate items of information from the tag storage area in order to determine the subset of defined experts or expert entities to be notified, the preferred contact method for the selected experts, and any additional information that is to be sent to the experts as part of the notification.

For example, the notification component 208 may cross-reference the event or event category with information in the expert tag 308 in order to determine which experts or expert entities are defined as being qualified to address the detected issue. With reference to the example expert tag 308 illustrated in FIG. 4, if the event information identifies the detected issue as being a mechanical downtime fault, the notification component 208 will select two of the define experts—a systems integrator and an OEM—to be notified of the event. The expert tag 308 also provides the notification component 208 with contact information for the respective experts, which will be used to deliver the notification data via the recipients' preferred means (e.g., email, text, automated voice message, social media posting, etc.).

In order to provide the recipients with sufficient information regarding the source of the notification and the nature of the detected event, notification component 208 can retrieve device or machine identification information from the system identification information 306. In some scenarios, the device or machine identification may comprise a user-defined name assigned to the industrial asset and recognizable by the recipient. Alternatively or in addition, the identification information can include a device model number or other vendor-defined identifier for the device or machine, current software or firmware version information if applicable, current device configuration settings, or other information that conveys to the recipients the identity of the industrial asset and any relevant asset configuration information. Since a notification of the detected even may be delivered to systems integrators or OEMs who are not direct employees of the industrial enterprise to which the industrial asset belongs, the system identification information may also include a customer name identifying the industrial enterprise that owns the industrial asset so that outside contractors will be informed of the customer from whom the notification was received. Information about the device or machine may be encrypted by the notification component 208 to ensure secure transport of the information to the recipients, such that access and/or decryption of the information is made possible by a security key provided to the recipients as part of the initial notification.

In some embodiments, the notification component 208 may also retrieve one or more maintenance notes 310 from the tag storage area. In such embodiments, the notification component 208 will select a subset of the stored maintenance notes determined to be relevant to the detected issue. For example, if the detected event is a software fault, the notification component 208 may retrieve the software version installation history from maintenance notes 310 for delivery to the selected recipients. In another example, a detected mechanical downtime issue may cause the notification component 208 to retrieve maintenance notes that were entered by maintenance personnel in connection with previous similar mechanical downtime events. Such maintenance notes may, for example, outline steps taken by maintenance personnel to address a previous mechanical fault.

Figure 7:
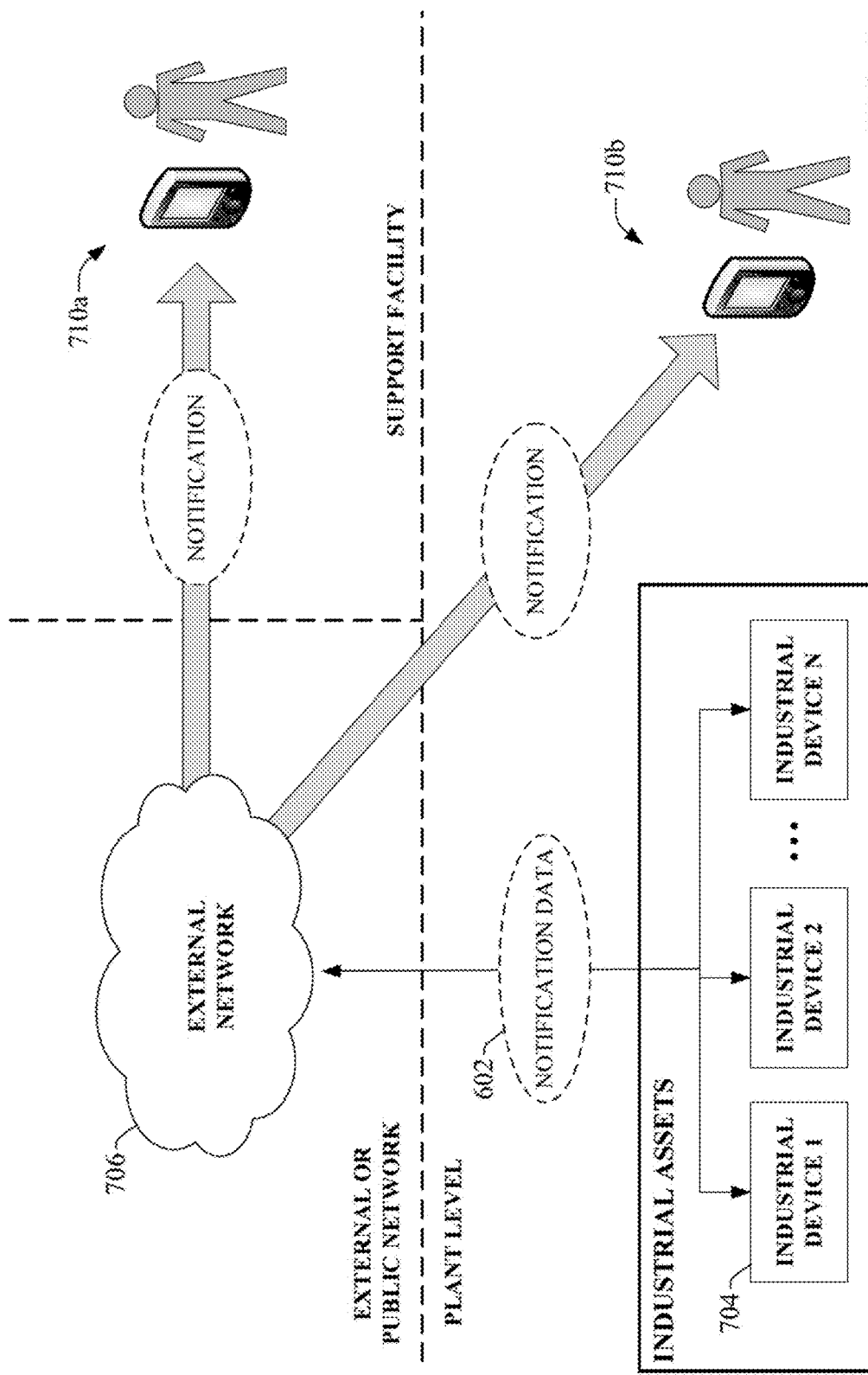
FIG. 7 is a diagram illustrating delivery of notifications to selected recipients.

After gathering the selected subset of tag information in response to the event notification, the notification component 208 sends notification data 602 to the communication component 216 for delivery to the selected recipients. Notification data 602 includes information identifying the detected event, as well as the relevant tag information collected from the tag storage area. Upon delivery to the recipients' target devices, the notification data 602 will render information about the event—e.g., the source of the event, the location and/or owner of the industrial asset, relevant device configuration and software version information, maintenance history, etc.—in a format suitable for display on the respective recipients' client devices. FIG. 7 is a diagram illustrating delivery of notifications to selected recipients according to one or more embodiments. In this example, a number of industrial devices 704 (e.g., industrial controllers, motor drives, telemetry devises, industrial robots, vision systems, etc.) are deployed within a plant environment, each having stored thereon tag information as described above. Each industrial device 704 also includes an event identification component 206, a notification component 208, and a communication component 216, as described above.

Communication component 216 communicatively couples the respective industrial devices 704 to an external network 706, which may be a public network such as the Internet, a private or public cloud platform, or other external network. In one or more embodiments, communication component 216 may be configured to support single-direction communication, such that data can be sent from the industrial devices 704 to the external network 706, but data cannot be written to the industrial devices from the external network. Alternatively, some embodiments of communication component 216 may be configured to support limited or secured bi-directional communication that allows a user to remotely access data on the industrial device via the external network 706. In such embodiments, notification information delivered to selected recipients may include security key data that permits access to and decryption of information on the industrial device. In some scenarios, the industrial devices 704 may be configured to access the external network through a common firewall device located on a plant network.

When the notification component 208 of one of the industrial devices 704 initiates sending a notification of a detected event (e.g., a machine downtime condition, a device abnormal, a process parameter that has fallen outside a defined range, etc.), the communication component 216 sends the notification data 602 generated by the notification component 208 to the external network 706 for delivery to the selected recipients. The communication component 216 leverages the contact information for the respective recipients in order to instruct the communication infrastructure of the external network how to deliver the notifications to the respective recipients. For example, for recipients whose preferred contact method is email, the communication component 216 will send the notification data as an email directed to the email address defined for the recipient in the tag storage area. Depending on the communication method specified for the respective recipients, the communication component 216 can also send the notification data as a text message to be directed to the user's mobile device via the communication platform of the external network 706, as a social media posting on the recipient's social media page, as an automated text-to-speech message to be directed to the user's mobile phone, or as another suitably formatted notification message.

The notification information is then delivered to the one or more selected recipients, who may reside outside the plant (e.g., recipient 710*a*) or within the plant (e.g., recipient 710*b*). Upon delivery, the notification information will render, on the respective client devices, information gathered by the notification component 208 from the tag storage area determined to be relevant to the detected event, including but not limited to the type of the event; the plant facility, work area, and/or machine affected by the event; a time at which the event occurred; current configuration settings of the source device; current versions of software or firmware installed on the source device; previously recorded maintenance notes relevant to the detected issue; a list of other people to whom notifications of the event were sent; etc.

In some embodiments, the notification component can also be configured to include a security key in the delivered notifications that enables the recipients to remotely connect to the industrial device via the external network 706 for a temporary time and access additional information available on the device that may assist in remotely diagnosing the detected issue. For example, a notification received on the recipient's client device may generate and render a control (e.g., a soft button or other activation means) that, when activated, initiates a process of connecting the client device to the industrial device via the external network. The security key included in the notification data authenticates the client device for remote access to the industrial device. Once connected, the recipient may remotely browse available data items (e.g., device statuses, previously stored maintenance notes, etc.) store on the industrial device. Browsing of the stored information may be performed in connection with encryption features implemented on the industrial device that ensures the information remains secure from users other than the recipient.

Although the configuration illustrated in FIG. 7 depicts the industrial devices 704 as sending the notifications via an external network (e.g., the Internet or a cloud platform) that resides outside the plant environment, in some embodiments, the industrial devices 704 may be configured to send notifications exclusively over an internal network such as a hard-wired or wireless plant network. In such configurations, notifications may be limited to personnel within the plant, since notifications will only be delivered to client devices accessible via the internal plant network.

Figure 8:
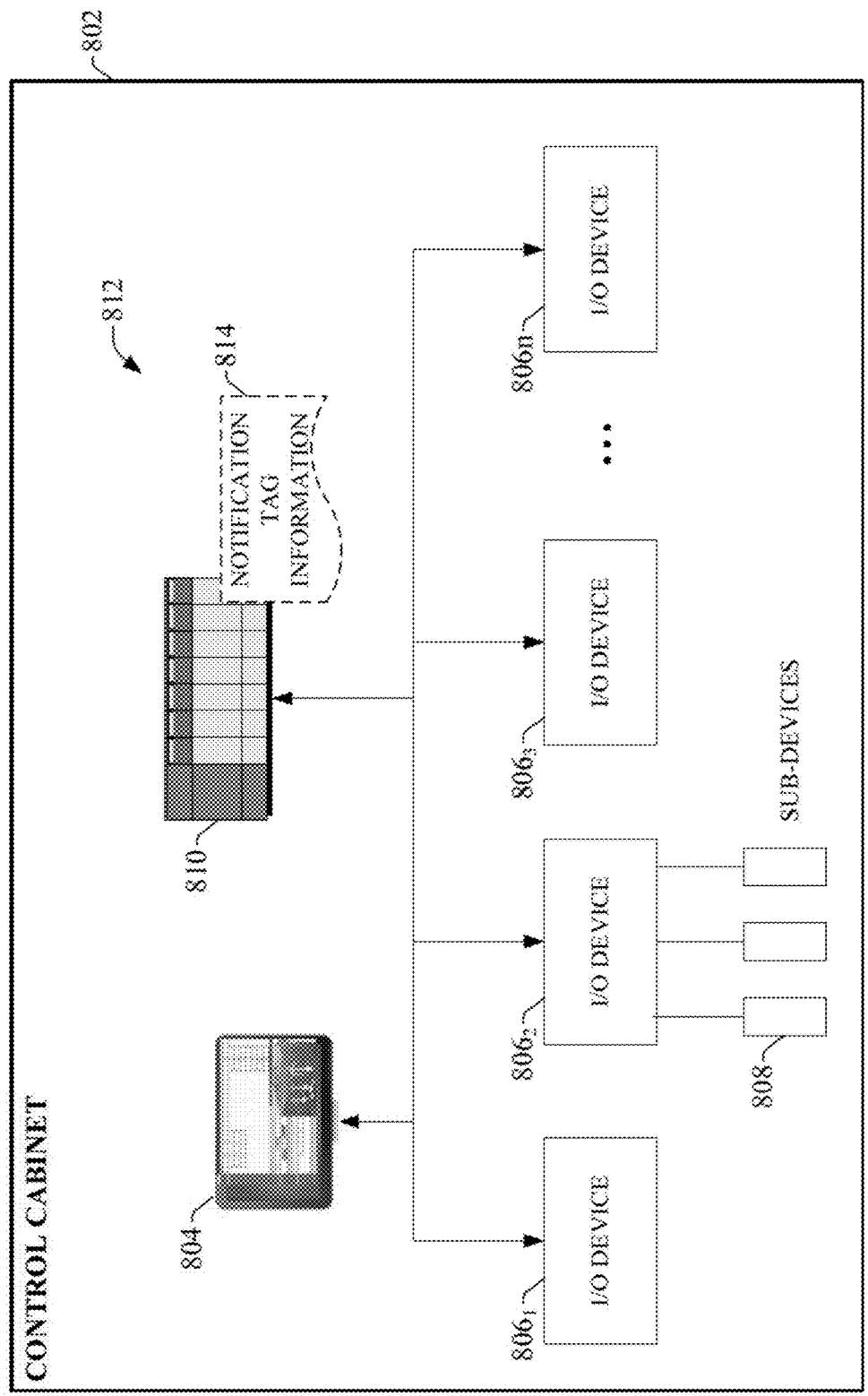
FIG. 8 is a diagram of an example control cabinet for a custom-build industrial machine in which an industrial controller manages notifications for the machine as a whole.

As noted above, the tag and notification features described above can be applied at the machine level as well as at the device level. Machine-level notifications can be useful when an industrial enterprise has taken possession of a custom machine designed, built, and installed by outside contractors such as OEMs or system integrators. FIG. 8 is a diagram of an example control cabinet for a custom-build industrial machine, in which an industrial controller (e.g., a PLC or other type of industrial controller) manages notifications for the machine as a whole. In this example, industrial controller 810 is mounted in a control cabinet 802 as part of a control system 812 to be installed at a plant facility. The control system 812 is housed in control cabinet 802, which may have been designed and built by an OEM, a systems integrator, or other machine builder to fulfill a customer order.

Control system 812 may comprise a number of I/O devices 806 (e.g., motor drives, sensors or other telemetry devices, solenoid valves, remote I/O modules, etc.) interfaced with the industrial controller 810. The I/O devices 806 may be hardwired to the industrial controller's I/O modules, or may exchange data with the industrial controller 810 over a local network (e.g., EthernetIP, common industrial protocol, etc.). In addition, one or more of the I/O devices 806 may have a number of sub-devices 808 connected thereto. For example, if an I/O device is a remote I/O module, sub-devices 808 may comprise the I/O devices connected to that remote I/O module. The control cabinet 802 may also include an HMI terminal 804 for visualizing the machine or process being controlled by the control system 812. The HMI terminal 804 is communicatively connected to the industrial controller 810 over a local network connection or an interface cable.

In this example, the notification functionality of the industrial controller 810 manages notifications for the machine as whole. Accordingly, industrial controller 810 maintains notification tag information 814 for the machine. The notification tag information 814 may define, as the pool of experts, the engineers and machine builders associated with the OEM that provided the machine, the engineers or technicians associated with a systems integrator that installed the machine at the customer site (if installation and integration was not handled by the OEM), technical support personnel associated with a vendor of the industrial controller 810 and/or the I/O devices 806 and sub-devices 808, as well as any local support personnel associated with the customer facility who may have been assigned responsibility for operating or maintaining the machine (e.g., machine operators, shift supervisors, on-site maintenance personnel or engineers, etc.). Since the industrial control program executing on the industrial controller 810 typically defines the machine fault conditions as a function of the states of the I/O devices and sub-devices (e.g., proximity and/or optical sensors, meters that monitor machine parameters, etc.), the event identification component 206 residing on the industrial controller 810 can detect fault conditions for the industrial machine based on states of data registers of the controller's data table corresponding to defined fault conditions.

Figure 9:
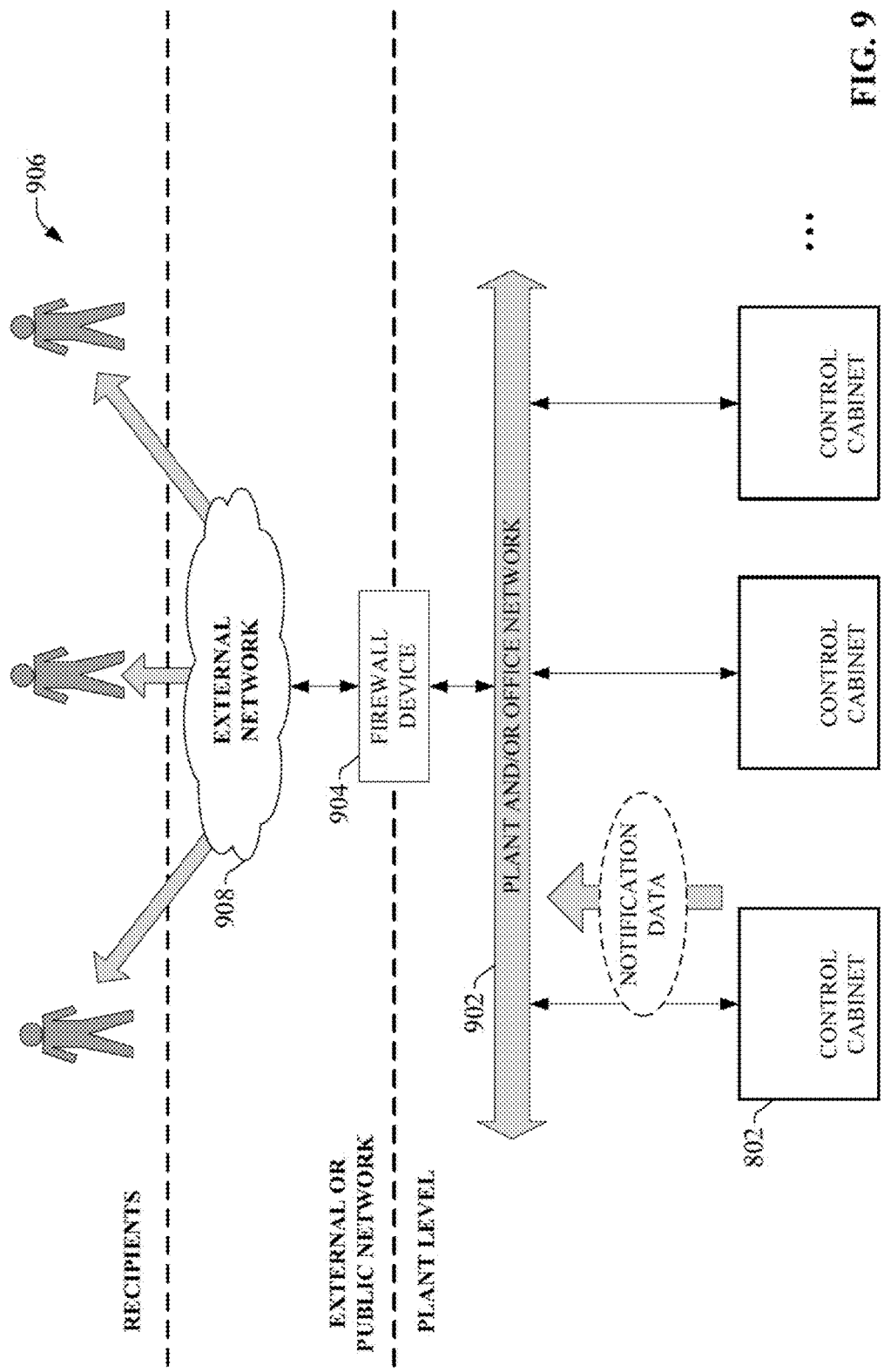
FIG. 9 is a diagram illustrating a control cabinet deployed within a plant environment and connected to a plant network, and which is capable of sending automated notifications to one or more recipients.

FIG. 9 is a diagram illustrating the control cabinet 802 deployed within a plant environment and connected to a plant network 902. When a fault condition for the machine has been detected by the event identification component 206 residing on the industrial controller 810, the controller's communication component sends notification data directed to selected expert recipients, as described in previous examples. In this example, the plant network 902 is connected to external network 908 (e.g., the Internet or a cloud platform) via a firewall device 904 that resides within the plant and serves as a secure gateway between the local plant network 902 and the external network 908. The communication component of the industrial controller is configured to package the notification data to yield one or more data packets capable of being conveyed to the external network 908 via the firewall device. Accordingly, the communication component can be configured with necessary security settings in order to allow the industrial controller to communicate to outside networks via the firewall device.

Figure 10:
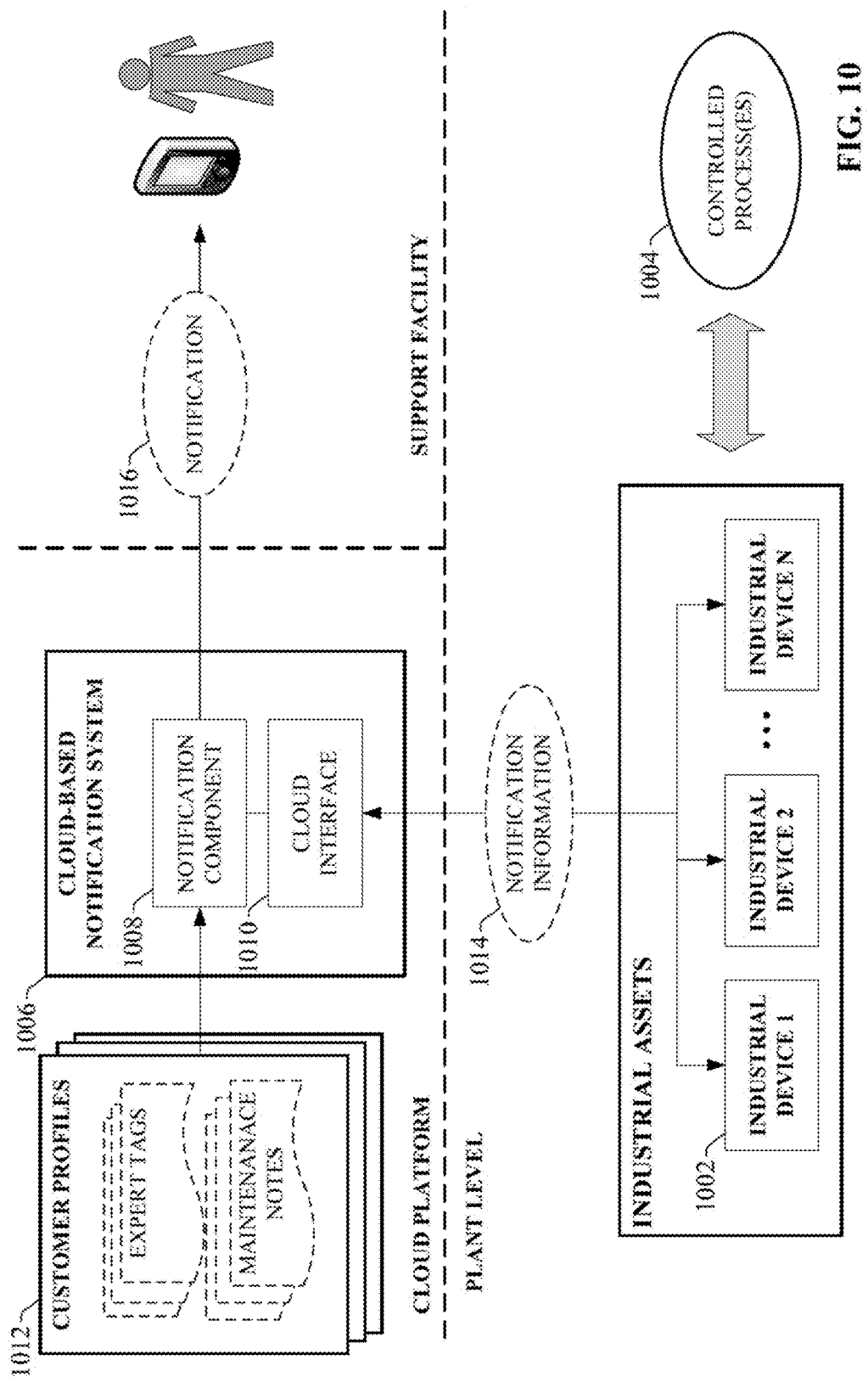
FIG. 10 is a diagram illustrating an example embodiment in which notification tag information and a notification component are maintained on a cloud platform as part of a cloud-based notification system.

Examples described above have depicted the notification tag information and notification component as residing on the industrial device or asset for which notifications are to be generated. In some alternative embodiments, the tag information and notification component may reside on an external network, such as a cloud platform. FIG. 10 is a diagram illustrating an example embodiment in which the notification tag information and notification component are maintained on a cloud platform as part of a cloud-based notification system 1006. In this example, one or more controlled processes 1004 are monitored and/or controlled by one or more industrial assets, which comprise one or more industrial devices 1002 (e.g., industrial controllers, sensors, meters, motor drives, or other such devices). Similar to previously described examples, industrial devices 1002 include an event identification component that detects occurrence of a defined condition requiring attention of expert personnel, as well as communication components that communicatively link the devices to an external network. In the present example, the external network is a cloud platform on which a cloud-based notification system 1006 executes as a cloud service.

The communication components of industrial devices 1002 can be configured to discover and interact with cloud-based computing services (including the cloud-based notification system) 1006 hosted by the cloud platform. The cloud platform can be any infrastructure that allows shared computing services to be accessed and utilized by cloud-capable devices. The cloud platform can be a public cloud accessible via the Internet by devices having Internet connectivity and appropriate authorizations to utilize the services. In some scenarios, the cloud platform can be provided by a cloud provider as a platform-as-a-service (PaaS). In some such configurations, access to the cloud platform and the notification system can be provided to customers as a subscription service by an owner of the notification system. Alternatively, the cloud platform can be a private cloud operated internally by the industrial enterprise. An example private cloud platform can comprise a set of servers hosting the notification service and residing on a corporate network protected by a firewall.

Hosting the notification system 1006 on a cloud platform allows a common notification system to service multiple industrial assets, including assets belonging to multiple different end customers or industrial enterprises. Since the notification system 1006 provides notification services to multiple customers, the expert tag information for multiple different industrial assets is stored on the cloud platform and segregated according to customer. For example, the expert tag and maintenance note information for respective different industrial assets can be segregated according to customer and stored as customer profiles 1012. Each customer profile can have an associated customer identifier that uniquely identifies the customer or industrial entity to whom the notification tag information belongs. In addition, each customer profile may also include other customer-level information, including but not limited to primary contact information for the customer, general notification preferences to be applied to all notifications for that customer, preferred support personnel, any service contract information between the customer and a support provider (e.g., OEM, systems integrator, vendor, etc.) that dictates how and when notifications are sent, or other such customer-specific information.

When the event identification component of an industrial device 1002 detects a notifiable event, the notification component of that device sends notification information 1014 to a cloud interface 1010 of the notification system 1006, which manages communication between the industrial assets and the cloud services. The notification information 1014 generated by the industrial device can include, for example, information identifying the event, the device or machine from which the event originated, and a customer identifier that identifies the customer or industrial enterprise that owns the industrial asset. Since the expert tag information is stored as part of a customer profile on the cloud platform, rather than on the industrial asset itself, the notification information 1014 sent to the cloud platform does not need to include recipient information and contact information. Instead, selection of one or more suitable experts to be notified of the event will be performed on the cloud platform by the cloud-based notification system 1006 in this configuration.

Upon receipt of the notification information 1014, the notification component 1008 will identify the customer profile corresponding to the customer identifier received in the notification information 1014, and cross-reference the reported event with the expert tag information stored in association with the selected customer profile in order to determine the set of qualified personnel to be notified of the event, in a manner similar to examples described above. The notification component 1008 can also retrieve any relevant maintenance notes stored in the customer profile determined to be relevant to the detected event and include these maintenance notes in the notification. The cloud-based notification system can then initiate delivery of a notification 1016 to the one or more identified experts in accordance with the specified contact preferences for each expert.

Storing the expert tag information on a centralized system as depicted in FIG. 10 allows the notification preferences for multiple different customers to be managed collectively by a single administrative entity. Moreover, since cloud-based storage is less limited than storage on the device level, this cloud-based architecture can be used to store additional information that affords a greater degree of control with regard to how and when notifications are sent. The cloud-based architecture can also at least partially automate some administrative aspects of technical support provision. For example, some embodiments of cloud-based notification system 1006 may be configured to enforce service agreements between customers and support providers. In such embodiments, a service agreement between an owner of the industrial assets and a support provider (e.g., device vendor, OEM, systems integrator, etc.) may define a limit on the number of support responses that can be provided to the customer by the support provider within the term of the service agreement (e.g., one year), or a time period during which contact can be made. Accordingly, the cloud-based notification system 1006 can track the number of notifications that have been sent to the support provider within the term of the service contract. If an impending notification will cause the customer to exceed their allotment of service requests, the notification system may send a preliminary notification to a specified representative of the customer to confirm that the notification should be sent, informing the customer that the support provider may charge an additional fee if the notification is sent. The customer's representative can then respond to this notification (e.g., by selecting a link or graphical control include in the preliminary message) instructing the notification system to either discard the impending notification or to proceed with sending the notification to the support entity. Since the cloud-based notification system 1006 can track the number of automated notifications sent to various support entities for each customer, this collected data can also be used for billing purposes if the customer's service contract charges for each service request.

In another example, some embodiments of the cloud-based notification system 1006 can be configured to generate automated work orders if the detected event is determined to require an on-site visit to the customer's plant facility by an outside contractor. In such embodiments, the expert tag information may categorize different event types according to whether a site visit by a support provider is expected to be necessary in order to resolve the detected issue. The cloud-based system may also include billing information for customers participating in the service agreement. When an industrial asset reports an issue categorized as requiring a site visit, the notification system can, in addition to sending a notification to the support provider, generate an electronic work order using the customer's billing information, and make the work order accessible to the support provider. In this way, the system can mitigate the need for the customer to generate a work order prior to the support provider's visit.

Similarly, some embodiments of the cloud-based notification system 1006 can allow the event types to be categorized according to whether a replacement device or component will be necessary (e.g., a failed meter or I/O module, etc.). When an industrial asset reports an issue that is defined as requiring a replacement part, the notification system 1006 can, in addition to sending notifications to the relevant personnel, generate a purchase order for the device or component to be replaced.

Figure 11A:
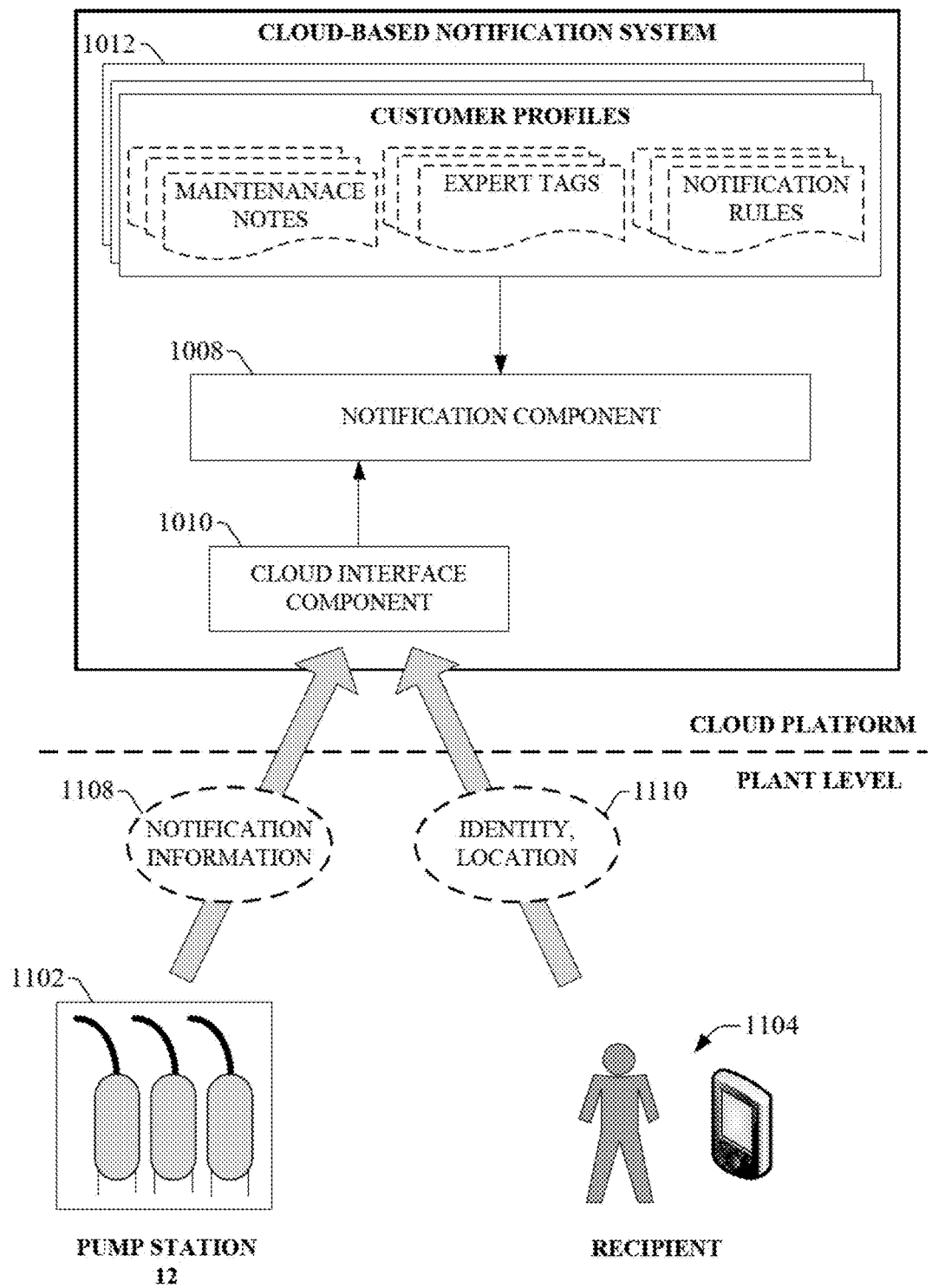
FIG. 11A is a diagram illustrating collection of data by a cloud-based notification system in connection with location-based notifications.
Figure 11B:
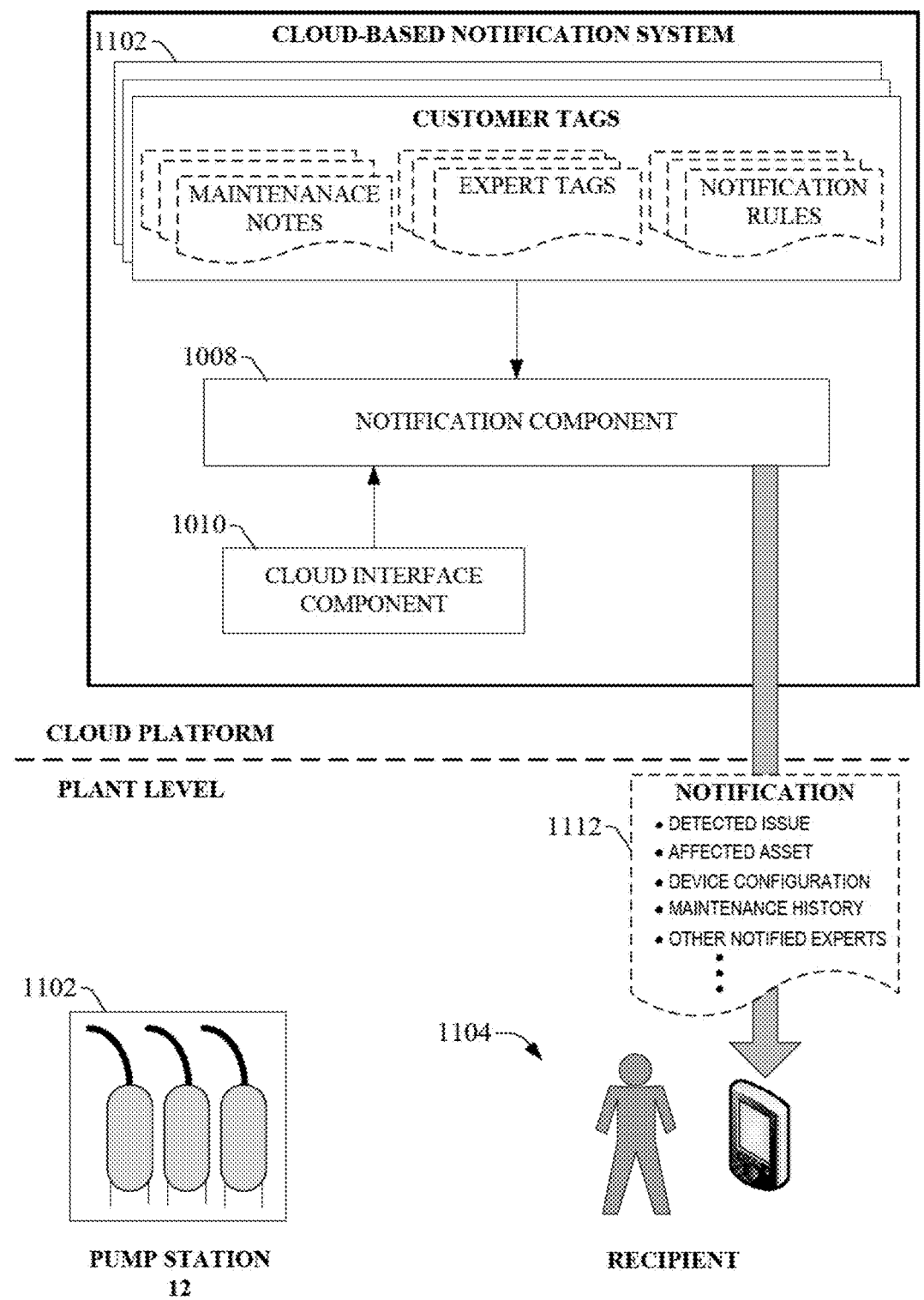
FIG. 11B is a diagram illustrating delivery of a location-based notification by a cloud-based notification system.

As noted above, some embodiments of the notification system can determine one or more suitable recipients for a notification based on the recipients' locations in addition to the other criteria defined by the expert tags. FIGS. 11A and 11B are diagrams illustrating location-based notification. In this example, in addition to receiving and conveying notification information, the cloud-based notification system is designed to track location information 1110 for one or more potential notification recipients. This location information 1110 can be received, for example, from a personal device carried by the recipient (e.g., a mobile phone) and communicatively connected to the cloud platform, where the location information 1110 is generated based on GPS capabilities of the user's personal device. In some embodiments, the location information 1110 can be collected from the user's personal mobile device by the cloud-based notification system on a continuous or semi-continuous basis, so that the potential recipients are tracked continuously. Alternatively, the system may audit or query the recipients' locations only when notification information 1108 is received from an industrial asset 1102 in order to assess which potential recipients satisfy a defined location requirement relative to the location of the industrial asset 1102. The location information 1110 may comprise, for example, a data packet containing an identity of the recipient (which can correlate with one of the expert identities defined in the expert tag information in one or more customer profiles 1012), as well as the geographical location of the recipient. In some embodiments, the data packet can be generated by an application installed on the user's mobile device and designed to work in conjunction with the cloud-based notification system.

In this embodiment, when notification data is received by the cloud-based notification system in response to a detected issue (e.g., a downtime event of a machine), the notification component 1008 determines a set of candidate experts to be notified of the event based on the expert tag data stored in the customer profiles 1012, as in the examples described above. Additionally, the notification component 1008 can determine which of the candidate experts satisfy a location requirement relative to the location of the asset 1102 affected by the detected issue. For example, the customer profile corresponding to the owner of asset 1102 may define that, if multiple candidate recipients are located within the plant facility in which the asset 1102 resides, only those recipients within a defined distance from the asset are to be notified. This condition can be determined, for example, by comparing the current locations of the recipients with the recorded location of the asset 1102 (e.g., as determined by the asset's location component 214). In this way, the system only notifies local experts who are nearest to the asset and thus able to respond more quickly to the issue. In some embodiments, this location criterion may be applied only to candidate recipients who are within the plant facility, while other support personnel outside the plant facility (e.g., OEMs, device vendors, systems integrators, etc.) who are also listed as suitable experts to be notified of the issue will be sent notifications regardless of their relative location to the asset.

As shown in FIG. 11B, once the notification component 1008 has identified a candidate expert 1104 who is tagged as being qualified to address the detected issue and who satisfies the location criterion, the notification component 1008 delivers a notification 1112 to the candidate expert 1104 using the contact information defined for the expert.

Figure 12:
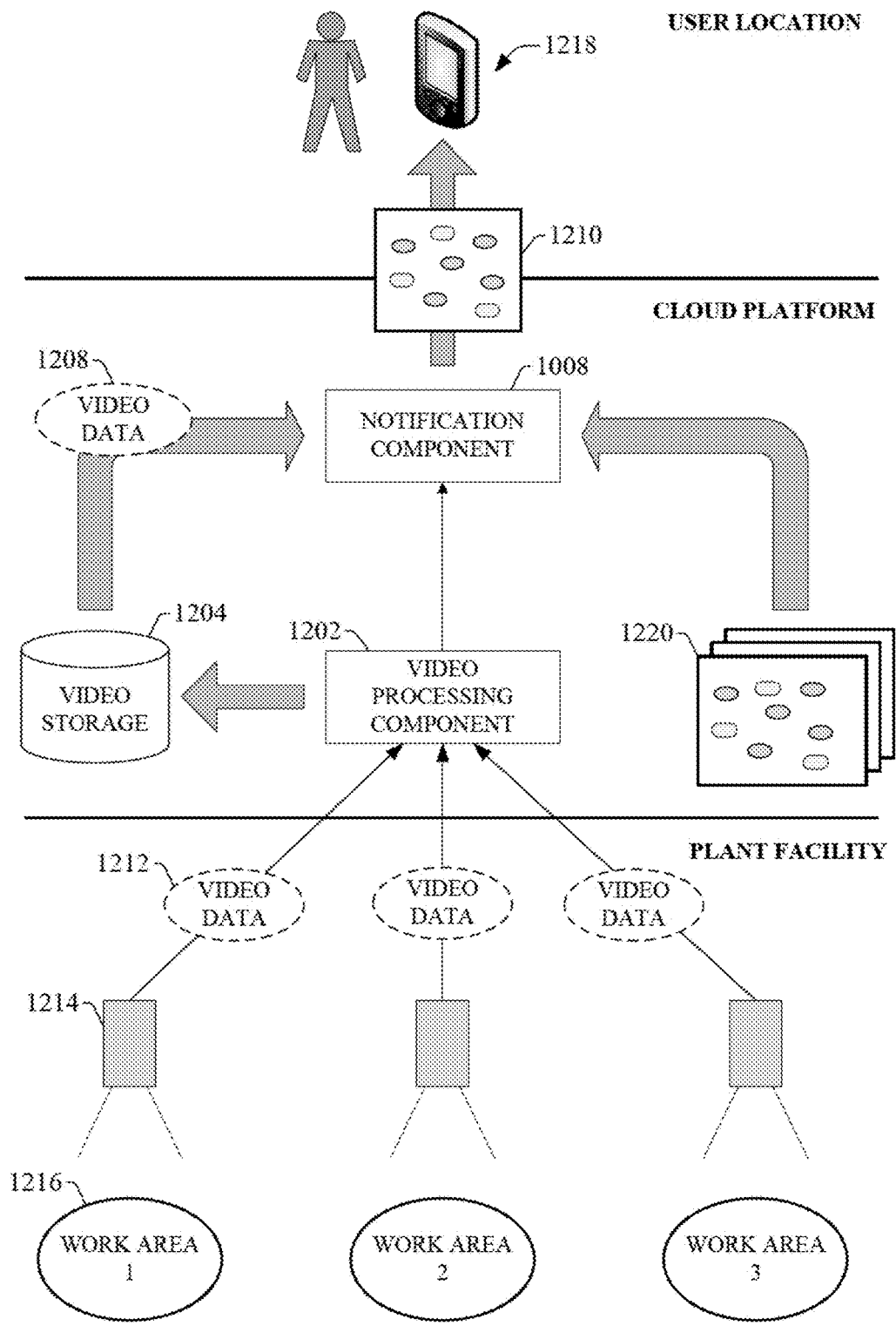
FIG. 12 is a diagram illustrating an example embodiment of a notification system that incorporates video presentations.

In addition to the notifications described above, one or more embodiments of the cloud-based notification system can also be configured to deliver live video streams of a device or machine to a user's personal device to facilitate remote visual diagnosis. FIG. 12 is a diagram illustrating an example embodiment of a notification system that incorporates video presentations. In this example, a number of video capture devices 1214 (e.g., digital video cameras or other types of video capture devices) are installed at various locations throughout the plant facility to capture video of respective work areas 1216. The video capture devices 1214 are installed on a network having access to the hardware or cloud-based platform on which the notification system is implemented. Each video capture device 1214 pushes video data 1212 to the search system as individual video streams. A video processing component 1202 associated with the cloud-based notification system can process and store each video stream on video storage 1204, such that the video data from each camera is tagged with identification information indicating the plant facility and work area recorded by the video data.

In this example, the notification component 1008 delivers a notification to a client device 1218 associated with a suitable expert in response to detection of an issue within one of the work areas 1216. Also, either in response to detection of the issue or in response to a subsequent request received from the user's client device 1218, the notification component 1008 can select a dashboard from a set of stored dashboards 1220 for visualization of data relating to the affected area. The notification component 1008 is configured to add a video presentation to the dashboard, which is delivered using a secure connection. For example, the dashboard 1210 provided to the user may include interactive controls that allow the user to add live or historical video data 1208 as an overlay on the dashboard if such video information is available for the work area represented by the dashboard. In response to interaction with these controls, the dashboard component can overlay the video data over a selected portion of the dashboard.

Figure 13:
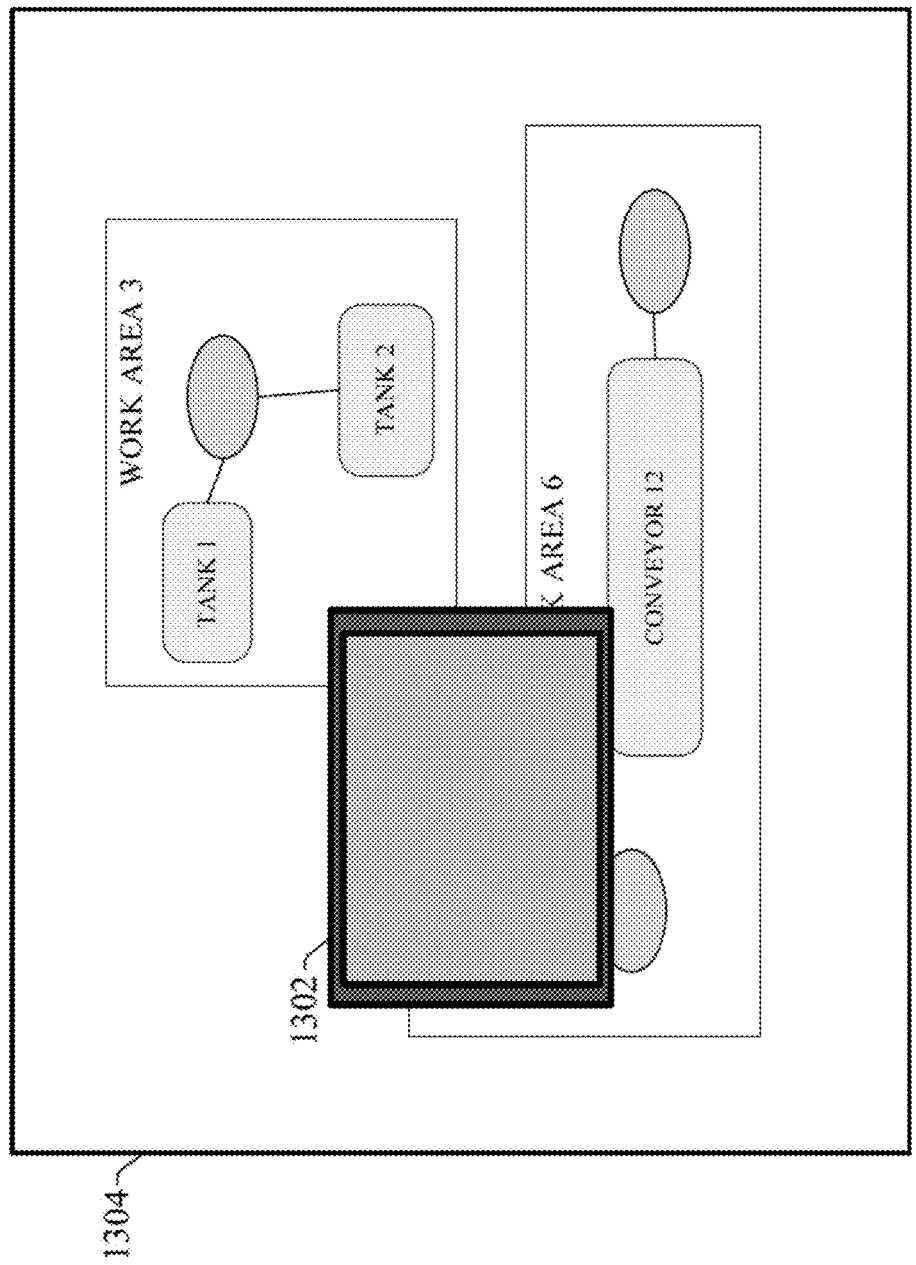
FIG. 13 is an example dashboard that includes a video window for streaming video information for a selected work area.

FIG. 13 illustrates an example dashboard 1304 that includes a video window 1302 for streaming video information for a selected work area. In this example, the dashboard includes a graphical representation of Work Area 6, which may include a control indicating that video is available for that area. Selection of this control causes the notification component 1008 to overlay video window 1302 on or near the Work Area 6 graphic. If the user selects a live video stream the notification component 1008 will begin streaming the most recent video information for Work Area 6 from video storage 1204 to the client device. In some embodiments, the user may also invoke a historical data stream by entering a day and time of interest via the dashboard 1304. In response, the notification component 1008 will retrieve the video data corresponding to the entered day and time, and stream this video information to the client device. Using this configuration, the user can invoke live or historical visual information for areas of interest via the search system. For example, if the dashboard indicates that an alarm condition is active for a particular machine, the user may invoke live or historical video in order to visually inspect the machine remotely via a mobile device.

Figure 14B:
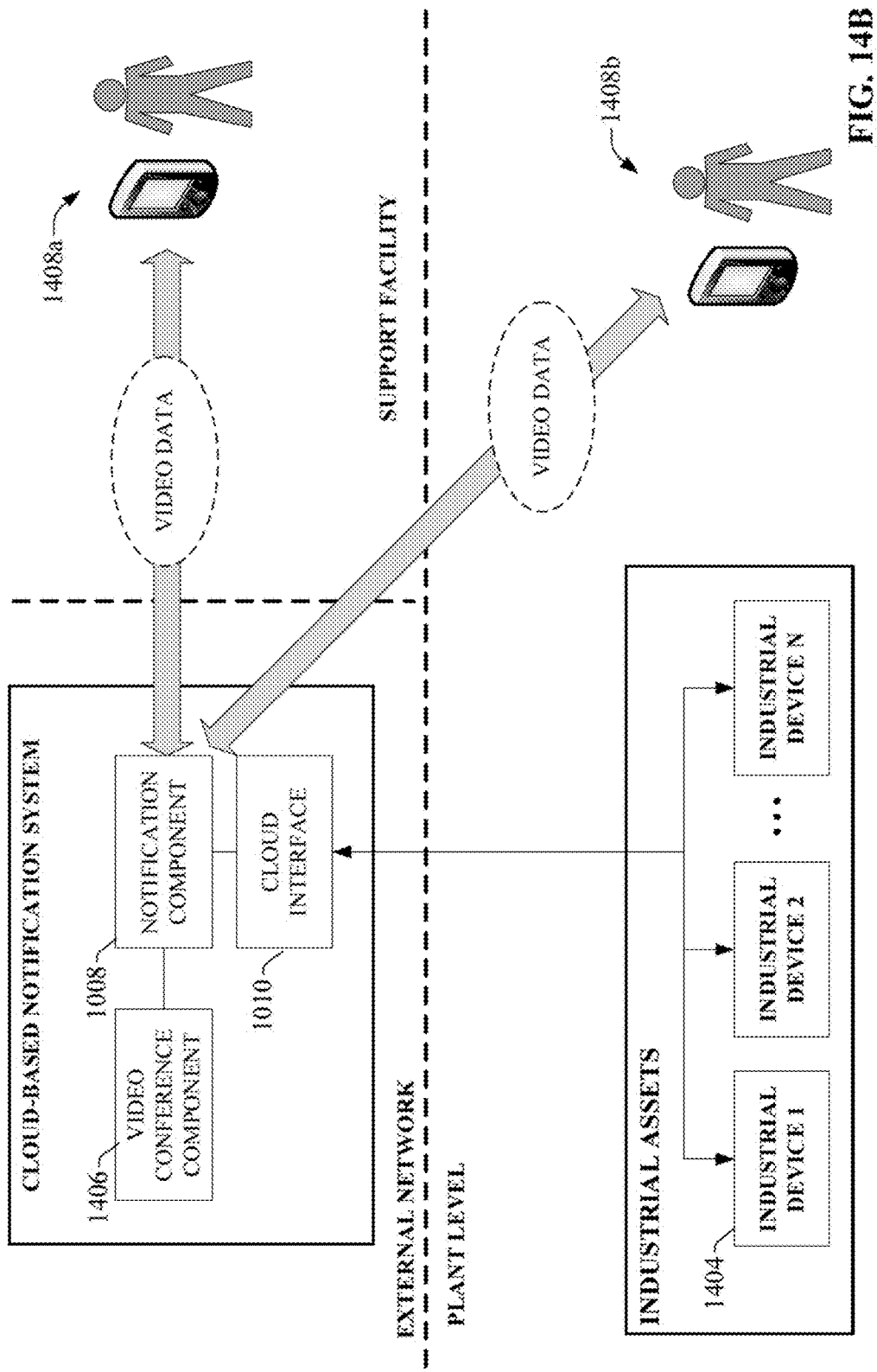
FIG. 14B is a diagram illustrating video conferencing between a remote expert and a local plant employee using a cloud-based notification system.

Also, some embodiments of the cloud-based notification system can facilitate video conferencing between experts who have been notified of a detected event. FIGS. 14A and 14B illustrate video conferencing between a remote expert and a local plant employee using the cloud-based notification system. In this example, an industrial device 1404 has detected a notifiable event (e.g., a machine downtime occurrence, a process parameter that has fallen outside a defined range, etc.) and sent notification information 1410 to the cloud-based notification system indicating one or more of the nature of the detected event, the effected device or machine, a customer identifier, or other relevant information, as described above in connection with FIG. 7. Two experts—a local expert 1408*a* located within the plant facility and a remote expert 1408*b* located at a remote support facility—have been selected to receive notifications of the event by the notification component 1008. As shown in FIG. 14B, the notification system also serves as video conferencing platform that allows the experts 1408*a* and 1408*b* to transmit video data from their respective client devices (e.g., video data collected using cameras integrated with the client devices) to the other client device via the cloud-based notification platform. In some embodiments, when an expert receives a notification of the detected event, the received notification can render an interactive dashboard on the expert's client device that displays information about the detected event, as well as a list of other experts who have been notified of the event. To initiate video conferencing with another user, the recipient may select one of the listed experts to initiate video conferencing with that expert. Selection of the expert from the list can cause a conferencing request to be sent to the selected user's client device via the notification system. If the selected user accepts the request, the notification system can establish a video conference between the two client devices. This configuration provides a platform for geographically remote users to discuss the detected issue, allowing the remote support person to verbally guide the local user through the process of addressing the issue while providing the local user with the ability to send live video of the issue back to the remote support person.

Figure 15:
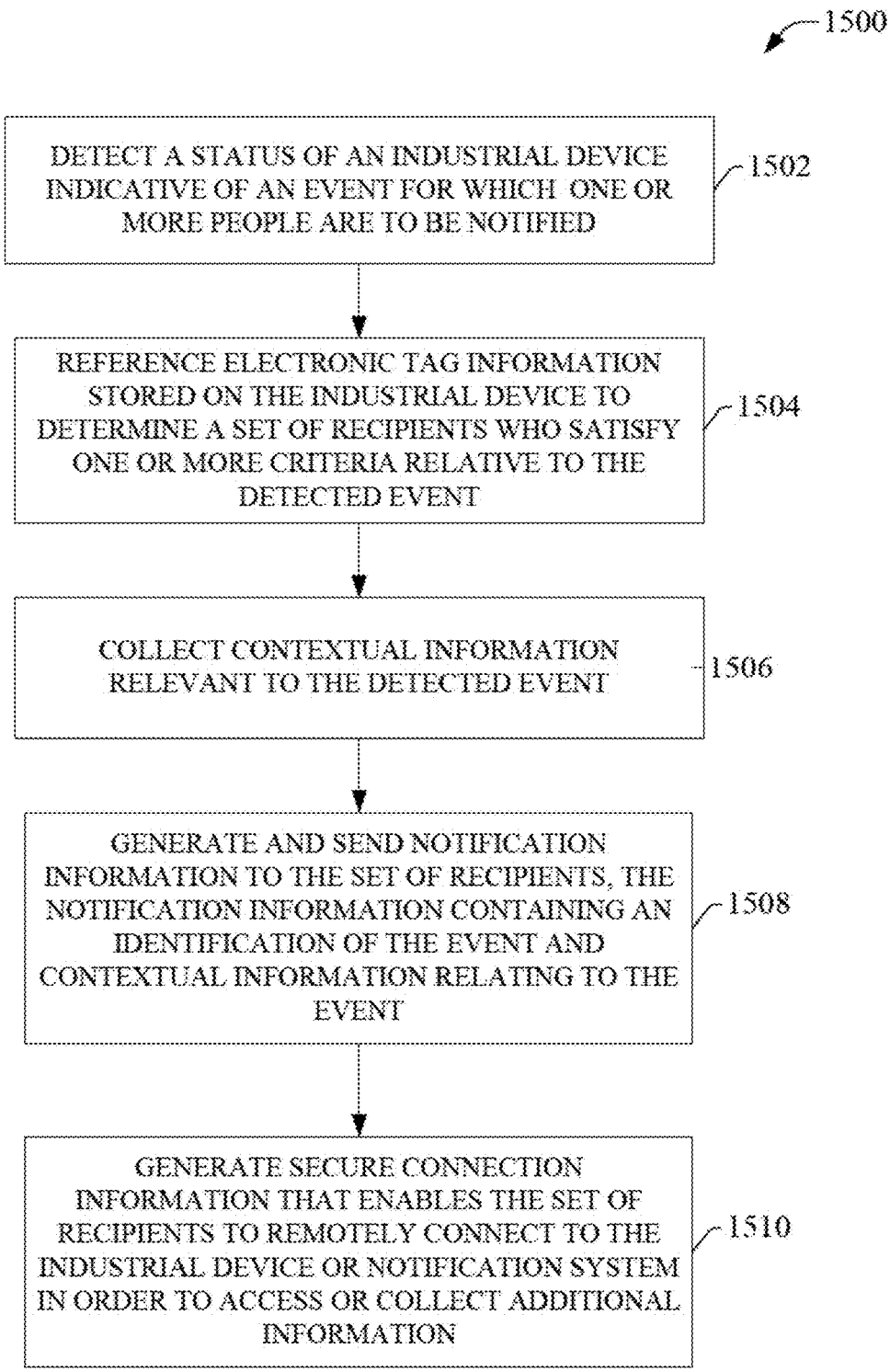
FIG. 15 is a flowchart of an example methodology for generating and delivering automated notifications of industrial events by an industrial device.
Figure 16:
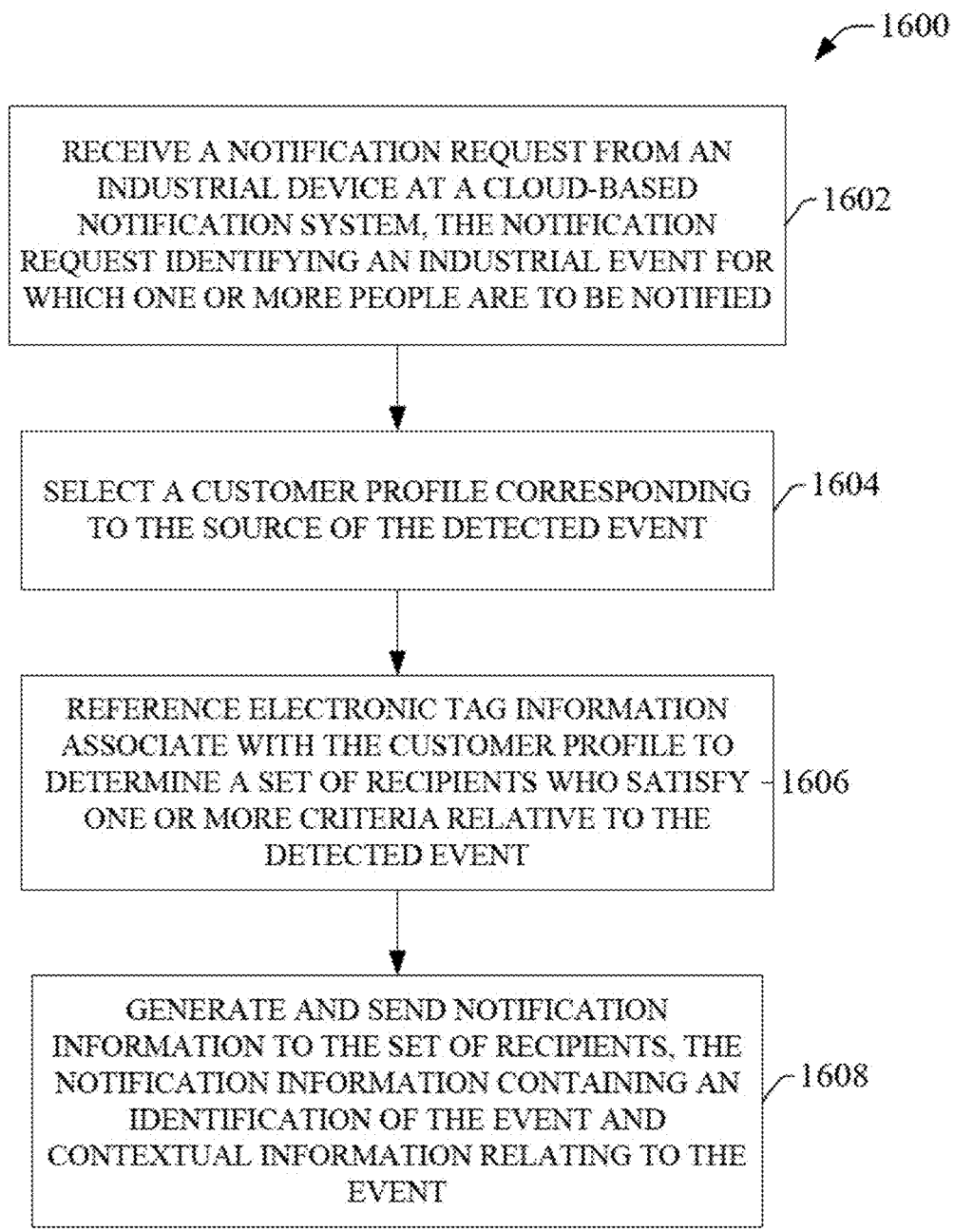
FIG. 16 is a flowchart of an example methodology for generating and delivering automated notifications of industrial events by a cloud-based notification system.

FIGS. 15-16 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 15 illustrates an example methodology 1500 for generating and delivering automated notifications of industrial events by an industrial device. Initially, at 1502, a status of an industrial device is detected, the status being indicative of an event for which one or more people are to be notified. The event may comprise, for example, a machine downtime occurrence, a device or machine fault, a process or operating parameter that has fallen outside a defined acceptable range, or other such event. The event can be detected by the industrial device itself (e.g., by the event identification component 206) based on an examination of one or more data registers on the device that indicate relevant device statuses and parameter values.

At 1504, electronic tag information stored on the industrial device is referenced to determine a set of recipients who satisfy one or more criteria relative to the event detected at step 1502. For example, the electronic tag information can define, for respective different events or event types, one or more experts qualified to address the event or event type. The electronic tag information can also define contact information for each expert, times that the respective experts are available, and other such information. A notification component of the industrial device can reference this tag information in order to determine which experts correspond to the event or event type, and are currently available to receive notifications.

At 1506, contextual information relevant to the detected event is collected by the industrial device. This contextual information can include, for example, a time at which the event occurred, configuration settings of the industrial device at the time the event occurred, a current software or firmware version installed in the industrial device, maintenance history information stored on the industrial device, or other such contextual information. At 1508, notification information is generated and sent to the set of recipients selected at step 1504, the notification information containing an identification of the event as well as the contextual information collected at step 1506. A communication component of the industrial device can send the notification information to the recipients via one or more wired or wireless networks, including but not limited to a plant network to which the device is connected, an external network such as the Internet or a cloud platform, a mobile telephone service platform, or other such networks.

At 1510, secure connection information is generated that enables the set of recipients to remotely connect to either the industrial device or a separate notification system in order to access or collect additional information about the event, the industrial device, and/or the owner of the industrial device. This may include, for example, generating authentication information that permits the set of recipients to access and/or decrypt the additional information.

FIG. 16 illustrates an example methodology for generating and delivering automated notifications of industrial events by a cloud-based notification system. Initially, at 1602, a notification request from an industrial device is received at a cloud-based notification system, the notification request identifying an industrial event for which one or more people are to be notified. The cloud-based notification system may execute on a cloud platform as a cloud-based service, and the notification request may be received from an industrial device that is communicatively linked to the cloud platform.

At 1604, a customer profile corresponding to the source of the detected event is selected by the cloud-based notification system. For example, the notification request may include a customer identifier that identifies a customer (e.g., an industrial enterprise or owner of an industrial asset) with whom the industrial device is associated. The cloud-based notification system may maintain on cloud storage a set of customer-specific profiles, each having associated expert tag information that correlates events and/or event types with respective experts who are to be notified in response to detection of the defined events or event types. When a notification request is received, the cloud-based notification system selects the customer profile corresponding to the customer identifier included in the request.

At 1606, electronic tag information associated with the customer profile selected at 1604 is referenced to determine a set of recipients who satisfy one or more criteria relative to the detected event (e.g., in a manner similar to step 1504 of methodology 1500). In some embodiments, in addition to the electronic tag information, the cloud-based notification system may consider other factors when selected a suitable set of recipients, including but not limited to the locations of the recipients relative to a source of the detected event. At 1608, notification information is generated and sent to the set of recipients by the cloud-based notification system, the notification information containing an identification of the event and contextual information relating to the event.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 17:
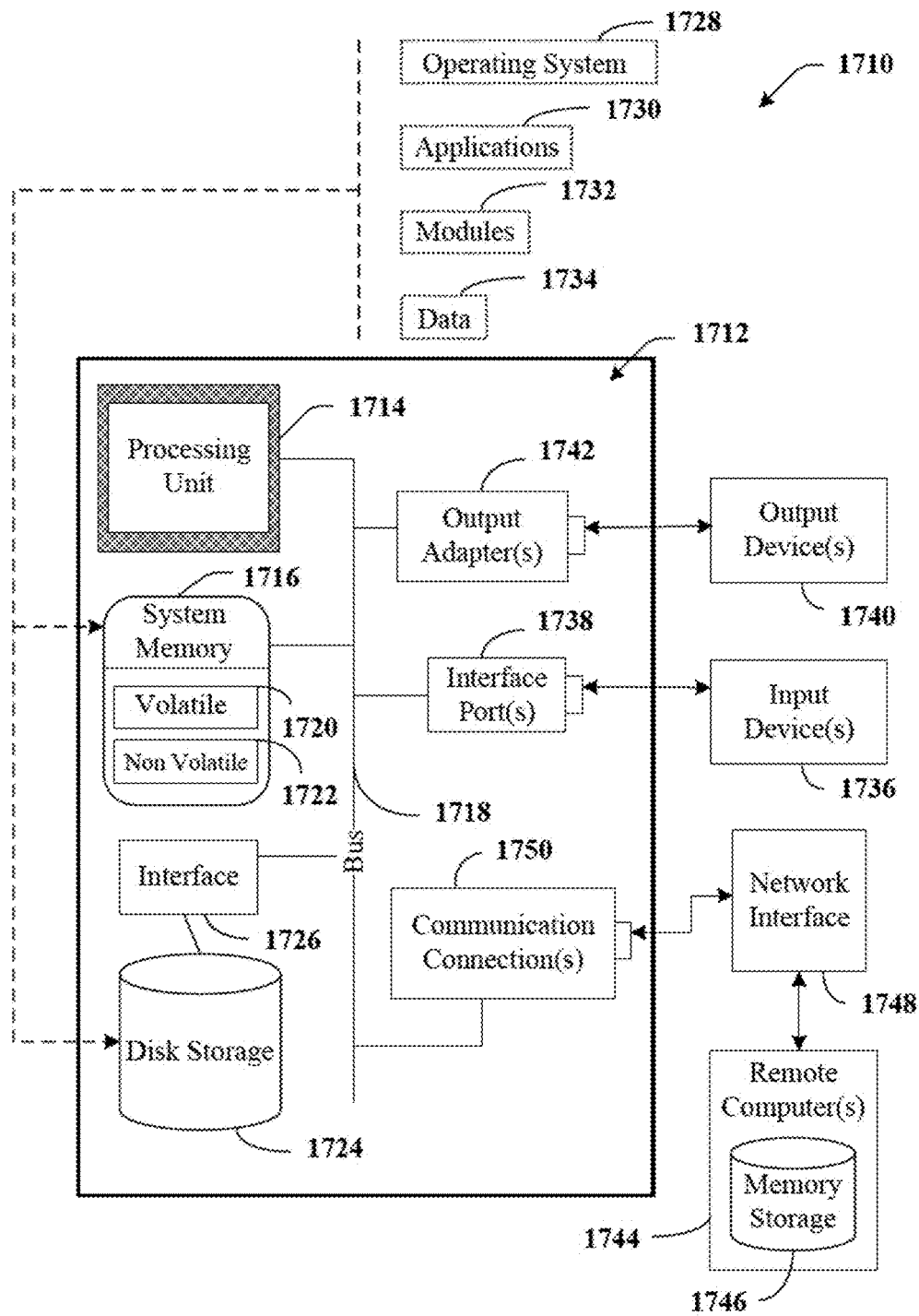
FIG. 17 is an example computing environment.
Figure 18:
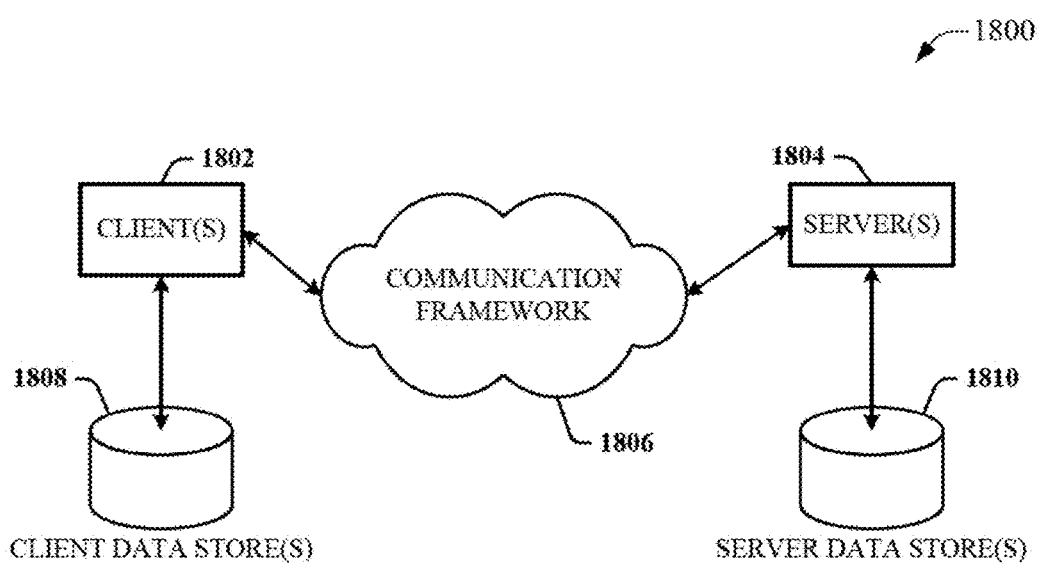
FIG. 18 is an example networking environment.

In order to provide a context for the various aspects of the disclosed subject matter, FIGS. 17 and 18 as well as the following discussion are intended to provide a brief, general description of a suitable environment in which the various aspects of the disclosed subject matter may be implemented.

With reference to FIG. 17, an example environment 1710 for implementing various aspects of the aforementioned subject matter includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Multi-core microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable PROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/non-volatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer 1712. System applications 1730 take advantage of the management of resources by operating system 1728 through program modules 1732 and program data 1734 stored either in system memory 1716 or on disk storage 1724. It is to be appreciated that one or more embodiments of the subject disclosure can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapters 1742 are provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1748 can also encompass near field communication (NFC) or Bluetooth communication.

Communication connection(s) 1750 refers to the hardware/software employed to connect the network interface 1748 to the system bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

FIG. 18 is a schematic block diagram of a sample computing environment 1800 with which the disclosed subject matter can interact. The sample computing environment 1800 includes one or more client(s) 1802. The client(s) 1802 can be hardware and/or software (e.g., threads, processes, computing devices). The sample computing environment 1800 also includes one or more server(s) 1804. The server(s) 1804 can also be hardware and/or software (e.g., threads, processes, computing devices). The servers 1804 can house threads to perform transformations by employing one or more embodiments as described herein, for example. One possible communication between a client 1802 and servers 1804 can be in the form of a data packet adapted to be transmitted between two or more computer processes. The sample computing environment 1800 includes a communication framework 1806 that can be employed to facilitate communications between the client(s) 1802 and the server(s) 1804. The client(s) 1802 are operably connected to one or more client data store(s) 1808 that can be employed to store information local to the client(s) 1802. Similarly, the server(s) 1804 are operably connected to one or more server data store(s) 1810 that can be employed to store information local to the servers 1804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial device, comprising:
a memory that stores executable components;
a processor, operatively coupled to the memory, that executes the executable components, the executable components comprising:
an event identification component configured to detect an event of the industrial device for which a notification is to be generated and to identify an event category of the event;
a notification component configured to determine a recipient for the notification based on expert tag information stored on the memory, and to generate notification information based on the event, wherein the expert tag information defines:
a first current location of the industrial device,
event categories, and
sets of one or more recipients respectively associated with the event type, categories, and
the notification component is configured to select, as the recipient, one of the defined recipients defined by the expert tag information as corresponding to the event category of the event, and having a second current location that is within a defined distance from the first current location defined by the expert tag;
a communication component configured to initiate a sending of the notification information to a client device associated with the recipient via an external network: and
a tag update component configured to add, as part of the expert tag information, a record of a software update performed on the industrial device in response to detection of the software update, wherein the communication component is configured to include the record of the software update in the notification information, and the tag update component is further configured to update the expert tag information based on at least one of manual input received via an interface component of the industrial device or an automatically detected status of the industrial device.

2. The industrial device of claim 1, wherein the event comprises at least one of a machine downtime condition, a device fault, a mechanical fault, a software fault, a condition in which a process parameter has fallen outside a defined range, an operational inefficiency, an alarm condition, or a scheduled maintenance event.

3. The industrial device of claim 1, wherein the expert tag information defines contact information for respective recipients of the sets of one or more recipients, and the communication component is configured to format the notification information for delivery in accordance with the contact information defined for the recipient.

4. The industrial device of claim 1, wherein the notification component is further configured to control sending of the notification information to the client device based at least in part on the second current location of the recipient.

5. The industrial device of claim 1, further comprising a location component configured to determine a geographical location of the industrial device,
wherein the communication component is further configured to include location information identifying the geographical location in the notification information.

6. The industrial device of claim 1, wherein
the notification component is further configured to retrieve, from the memory, one or more maintenance notes determined to be relevant to the event of the industrial device, and
the communication component is further configured to include the one or more maintenance notes in the notification information.

7. The industrial device of claim 1, wherein the industrial device comprises at least one of an industrial controller, a motor drive, a meter, a telemetry device, a sensor, an industrial robot, or a vision system.

8. The industrial device of claim 1, wherein the expert tag information comprises:
a first data table that defines associations between the event categories and respective expert roles qualified to address the respective event categories, and
a second data table that defines associations between the expert roles and the sets of one or more recipients.

9. A method for generating automated notifications, comprising:
in response to detecting a software update performed on an industrial device, recording, by a system comprising a processor, a record of the software update in expert tag information stored on the industrial device;
detecting, by the system, occurrence of an event associated with the industrial device;
determining, by the system, an event type corresponding to the event;
determining, by the system, a recipient to be notified of the event based on the expert tag information stored on the industrial device, wherein the determining comprises:
determining a first location of the industrial device based on location data stored as part of the expert tag information, and
selecting the recipient in response to determining that the event type of the event is defined in the expert tag information as being associated with the recipient and that a second location of the recipient is within a defined distance of the first location of the industrial device;
generating, by the system, notification information based on the event;
initiating, by the system, a sending of the notification information to a client device associated with the recipient via an external network, wherein the notification information includes the record of the software update; and
updating, by the system, the expert tag information based on at least one of manual input or an automatically detected status of the industrial device.

10. The method of claim 9, wherein the detecting the occurrence of the event comprises detecting at least one of a machine downtime event, a device fault, a mechanical fault, a software fault, a condition in which a process parameter has fallen outside a defined range, an operational inefficiency, an alarm condition, or a scheduled maintenance event.

11. The method of claim 9, wherein the sending comprises sending the notification information in accordance with contact information defined for the recipient by the expert tag information.

12. The method of claim 9, wherein the generating comprises generating the notification information to include security credential information that enables remote access to the industrial device by the client device.

13. The method of claim 9, wherein the generating comprises generating the notification information to include the first location of the industrial device.

14. The method of claim 9, wherein the generating comprises:
retrieving one or more maintenance notes stored or, the industrial device determined to be relevant to the event; and
generating the notification information to include the maintenance notes.

15. The method of claim 9, further comprising:
receiving and storing, by the system, video streams from respective video capture devices, and
sending, by the system as part of the notification information, a video presentation to the client device, the video presentation comprising a selected subset of the video streams.

16. A non-transitory computer-readable medium having stored thereon instructions that, in response to execution, cause a system comprising a processor to perform operations, the operations comprising:
in response to detecting a software update performed on an industrial device, adding a record of the software update in expert tag information stored on the industrial device;
determining that an event associated with the industrial device has occurred for which a notification is to be generated;
determining an event type of the event;
referencing the expert tag information stored on the industrial device based on an identification of the event, wherein the expert tag information identifies a first location of the industrial device and assigns recipients to respective event types;
selecting one or more recipients for the notification based on the referencing, wherein the selecting comprises selecting, as the one or more recipients, a subset of the recipients that are assigned to the event type of the event and that are currently located at respective one or more second locations that are less than a defined distance from the first location of the industrial device;

generating the notification based on the event and device information included in the expert tag information;

initiating a sending of the notification to one or more client devices respectively associated with the one or more recipients, wherein the notification includes the record of the software update; and updating the expert tag information based on at least one of manual input or an automatically detected status of the industrial device.

17. The non-transitory computer-readable medium of claim 16, wherein the determining that the event has occurred comprises detecting, as the event, at least one of a machine downtime event, a device fault, a mechanical fault, a software fault, a condition in which a process parameter has fallen outside a defined range, an operational inefficiency, an alarm condition, or a scheduled maintenance event.

18. The non-transitory computer-readable medium of claim 16, wherein the generating comprises generating the notification to include security credential information that enables remote access to the industrial device by the one or more client devices.

19. The non-transitory computer-readable medium of claim 16, wherein the generating comprises:
generating the notification information to include the first location of the industrial device.

20. The non-transitory computer-readable medium of claim 16, wherein the generating comprises:
retrieving one or more maintenance notes stored on the industrial device determined to be relevant to the event; and
generating the notification information to include the maintenance notes.

* * * * *